United States Patent
Shin et al.

(10) Patent No.: US 10,661,874 B2
(45) Date of Patent: *May 26, 2020

(54) SHIP

(71) Applicant: DAEWOO SHIPBUILDING & MARINE ENGINEERING CO., LTD., Seoul (KR)

(72) Inventors: Hyun Jun Shin, Seoul (KR); Dong Kyu Choi, Seongnam-si (KR); Young Sik Moon, Gwangmyeong-si (KR); Su Kyung An, Gwangmyeong-si (KR); Hyun Min Jang, Seoul (KR); Jae Wook Son, Seoul (KR); Joon Chae Lee, Seoul (KR)

(73) Assignee: DAEWOO SHIPBUILDING & MARINE ENGINEERING CO., LTD., Seoul (KR)

( * ) Notice: Subject to any disclaimer, the term of this patent is extended or adjusted under 35 U.S.C. 154(b) by 55 days.

This patent is subject to a terminal disclaimer.

(21) Appl. No.: 15/579,581

(22) PCT Filed: Apr. 5, 2016

(86) PCT No.: PCT/KR2016/003541
§ 371 (c)(1),
(2) Date: Dec. 4, 2017

(87) PCT Pub. No.: WO2016/195229
PCT Pub. Date: Dec. 8, 2016

(65) Prior Publication Data
US 2018/0170506 A1    Jun. 21, 2018

(30) Foreign Application Priority Data

Jun. 2, 2015 (KR) .................. 10-2015-0078142
Sep. 25, 2015 (KR) .................. 10-2015-0135999
Sep. 25, 2015 (KR) .................. 10-2015-0136257

(51) Int. Cl.
*F17C 9/02* (2006.01)
*B63H 21/38* (2006.01)
(Continued)

(52) U.S. Cl.
CPC ............. *B63H 21/38* (2013.01); *B63B 25/16* (2013.01); *F02M 21/0287* (2013.01); *F17C 6/00* (2013.01);
(Continued)

(58) Field of Classification Search
CPC ........ F25J 1/0035; F25J 1/0037; F25J 1/0201; F25J 1/0202; F25J 1/0025; F25J 2210/90;
(Continued)

(56) References Cited

U.S. PATENT DOCUMENTS 6,220,053 B1 * 4/2001 Hass, Jr. ................ F25J 1/0015
62/613
6,901,762 B2 * 6/2005 Irie .......................... F17C 1/002
62/48.2

(Continued)

FOREIGN PATENT DOCUMENTS

CN          1820163 A      8/2006
CN       101915494 A     12/2010
(Continued)

OTHER PUBLICATIONS

KR-101242949-B1 Translation.*
(Continued)

*Primary Examiner* — Brian M King
(74) *Attorney, Agent, or Firm* — Knobbe Martens Olson & Bear LLP

(57) ABSTRACT

A ship includes: a boil-off gas heat exchanger which is installed on a downstream of a storage tank and heat-exchanges a compressed boil-off gas ("a first fluid") by a boil-off gas discharged from the storage tank as a refrigerant
(Continued)

to cool the boil-off gas; a compressor installed on a downstream of the boil-off gas heat exchanger and compresses a part of the boil-off gas from the storage tank; an extra compressor which is installed on a downstream of the boil-off gas heat exchanger and in parallel with the compressor and compresses the other part of the boil-off gas from the storage tank; a refrigerant heat exchanger which additionally cools the first fluid; and a refrigerant decompressing device which expands a second fluid, which is sent to the refrigerant heat exchanger, and then sends the second fluid back to the refrigerant heat exchanger.

8 Claims, 7 Drawing Sheets

(51) Int. Cl.
    *F02M 21/02*     (2006.01)
    *F25J 1/00*     (2006.01)
    *F25J 1/02*     (2006.01)
    *F17C 6/00*     (2006.01)
    *B63B 25/16*     (2006.01)
    *B63J 99/00*     (2009.01)

(52) U.S. Cl.
    CPC ............... *F17C 9/02* (2013.01); *F25J 1/004* (2013.01); *F25J 1/0025* (2013.01); *F25J 1/0037* (2013.01); *F25J 1/0045* (2013.01); *F25J 1/0202* (2013.01); *F25J 1/023* (2013.01); *F25J 1/0249* (2013.01); *F25J 1/0277* (2013.01); *F25J 1/0288* (2013.01); *F25J 1/0294* (2013.01); *B63J 2099/003* (2013.01); *F02M 21/0215* (2013.01); *F17C 2221/033* (2013.01); *F17C 2223/0161* (2013.01); *F17C 2223/033* (2013.01); *F17C 2227/0185* (2013.01); *F17C 2227/0339* (2013.01); *F17C 2227/0358* (2013.01); *F17C 2265/03* (2013.01); *F17C 2265/037* (2013.01); *F17C 2265/066* (2013.01); *F17C 2270/0105* (2013.01); *F25J 2290/72* (2013.01); *Y02T 10/32* (2013.01)

(58) Field of Classification Search
    CPC ..... F25J 2245/90; F17C 9/02; F17C 2265/03; F17C 2265/031; F17C 2265/032; F17C 2265/033
    See application file for complete search history.

(56) References Cited

U.S. PATENT DOCUMENTS

| | | | |
|---|---|---|---|
| 10,364,013 B2 | 7/2019 | Shin et al. | |
| 10,399,655 B2 | 9/2019 | Shin et al. | |
| 2004/0068993 A1 | 4/2004 | Irie et al. | |
| 2011/0056238 A1* | 3/2011 | Mak ............... | F17C 9/04 62/614 |
| 2011/0056328 A1 | 3/2011 | Ko | |
| 2011/0094262 A1 | 4/2011 | Turner et al. | |
| 2012/0036888 A1 | 2/2012 | Vandor | |
| 2014/0202585 A1* | 7/2014 | Barker ............ | F17C 5/06 141/4 |
| 2015/0330574 A1 | 11/2015 | Fuchs et al. | |
| 2016/0114876 A1 | 4/2016 | Lee et al. | |
| 2018/0148138 A1 | 5/2018 | Shin et al. | |
| 2018/0162492 A1 | 6/2018 | An et al. | |
| 2018/0170503 A1 | 6/2018 | Shin et al. | |
| 2018/0170504 A1 | 6/2018 | Shin et al. | |
| 2018/0170505 A1 | 6/2018 | Shin et al. | |
| 2018/0170507 A1 | 6/2018 | Shin et al. | |
| 2018/0327056 A1 | 11/2018 | Lee et al. | |

FOREIGN PATENT DOCUMENTS

| | | | |
|---|---|---|---|
| CN | 102084114 A | 6/2011 | |
| CN | 102084171 A | 6/2011 | |
| CN | 102660341 A | 9/2012 | |
| CN | 103097237 A | 5/2013 | |
| CN | 103562536 A | 2/2014 | |
| EP | 2623414 A1 | 8/2013 | |
| JP | H11-210993 A | 8/1999 | |
| JP | 2001-132898 A | 5/2001 | |
| JP | 2001-279280 A | 10/2001 | |
| JP | 3213846 B2 | 10/2001 | |
| JP | 56-65092 A | 4/2009 | |
| JP | 2009-079665 A | 4/2009 | |
| JP | 2010025152 A | 2/2010 | |
| KR | 10-2002-0069390 A | 9/2002 | |
| KR | 10-2006-0123675 A | 12/2006 | |
| KR | 10-2008-0113046 A | 12/2008 | |
| KR | 10-2010-0108932 A | 10/2010 | |
| KR | 10-1153080 B1 | 6/2012 | |
| KR | 10-2012-0107886 A | 10/2012 | |
| KR | 10-1194474 B1 | 10/2012 | |
| KR | 10-1242949 B1 | 3/2013 | |
| KR | 101242949 B1 * | 3/2013 | ............. F25J 1/0027 |
| KR | 10-2013-0062006 A | 6/2013 | |
| KR | 10-1290032 B1 | 7/2013 | |
| KR | 10-1298623 B1 | 8/2013 | |
| KR | 10-1310025 B1 | 9/2013 | |
| KR | 10-2014-0075582 A | 6/2014 | |
| KR | 10-2014-0107504 A | 9/2014 | |
| KR | 10-2014-0130092 A | 11/2014 | |
| KR | 10-2015-0001600 A | 1/2015 | |
| KR | 10-1488100 B1 | 1/2015 | |
| KR | 10-1490717 B1 | 2/2015 | |
| KR | 10-1511214 B1 | 4/2015 | |
| KR | 10-2015-0049748 A | 5/2015 | |
| KR | 10-2015-0050113 A | 5/2015 | |
| WO | 2004/109206 A1 | 12/2004 | |
| WO | 2009/126604 A1 | 10/2009 | |
| WO | 2009/136793 A1 | 11/2009 | |
| WO | 2012/043274 A1 | 4/2012 | |
| WO | 2012/128448 A1 | 9/2012 | |
| WO | 2016126025 A1 | 8/2016 | |
| WO | 2016/195229 A1 | 12/2016 | |
| WO | 2016/195230 A1 | 12/2016 | |
| WO | 2016/195231 A1 | 12/2016 | |
| WO | 2016/195232 A1 | 12/2016 | |
| WO | 2016/195233 A1 | 12/2016 | |
| WO | 2016/195237 A1 | 12/2016 | |
| WO | 2016/195279 A1 | 12/2016 | |

OTHER PUBLICATIONS

International Search Report dated Jul. 5, 2016 of PCT/KR2016/003541 which is the parent application and its English translation—4 pages.
International Preliminary Report on Patentability dated Dec. 5, 2017 of PCT/KR2016/003541 which is the parent application—7 pages.
Office Action of corresponding Chinese Patent Application No. 201680045324.4—7 pages (dated Feb. 1, 2019).
Partial Supplementary European Search Report of Patent Application No. 16803584.8—21 pages (dated Feb. 19, 2019).
Office Action in corresponding Chinese Patent Application No. 201680045491.9—in 11pages, (dated Feb. 2, 2019).
Office Action in corresponding Chinese Patent Application No. 201680045478.3—in 9 pages, (dated Feb. 1, 2019).
Office Action in corresponding Chinese Patent Application No. 201680045502.3—in 11 pages, (dated Feb. 2, 2019).
Extended European Search Report in corresponding European Patent Applicaton No. 16803585.5—in 18 pages (dated Feb. 19, 2019).
Extended European Search Report in corresponding European Patent Application No. 16803586.3—in 16 pages (dated Feb. 19, 2019).
Extended European Search Report in corresponding European Patent Application No. 16803587.1—in 17 pages (dated Feb. 19, 2019).

(56) References Cited

OTHER PUBLICATIONS

Extended European Search Report in corresponding European Patent Application No. 16803592.1—in 10 pages (dated Feb. 19, 2019).
Search Report & Written Opinion of corresponding Singaporean Patent Application No. 11201709996S—12 pages (dated Jul. 5, 2018).
Notice of Allowance of corresponding Korean Patent Application No. 10-2015-0125519—4 pages (dated Apr. 7, 2016).
Notice of Allowance of corresponding Korean Patent Application No. 10-2015-0158922—2 pages (dated May 29, 2017).
Extended European Search Report of corresponding Patent Application No. 16803634.1—15 pages (dated Jul. 3, 2019).
Notice of Allowance of corresponding Japanese Patent Application No. 2016-556019—3 pages, (dated Jan. 9, 2018).

* cited by examiner

[FIG 1]
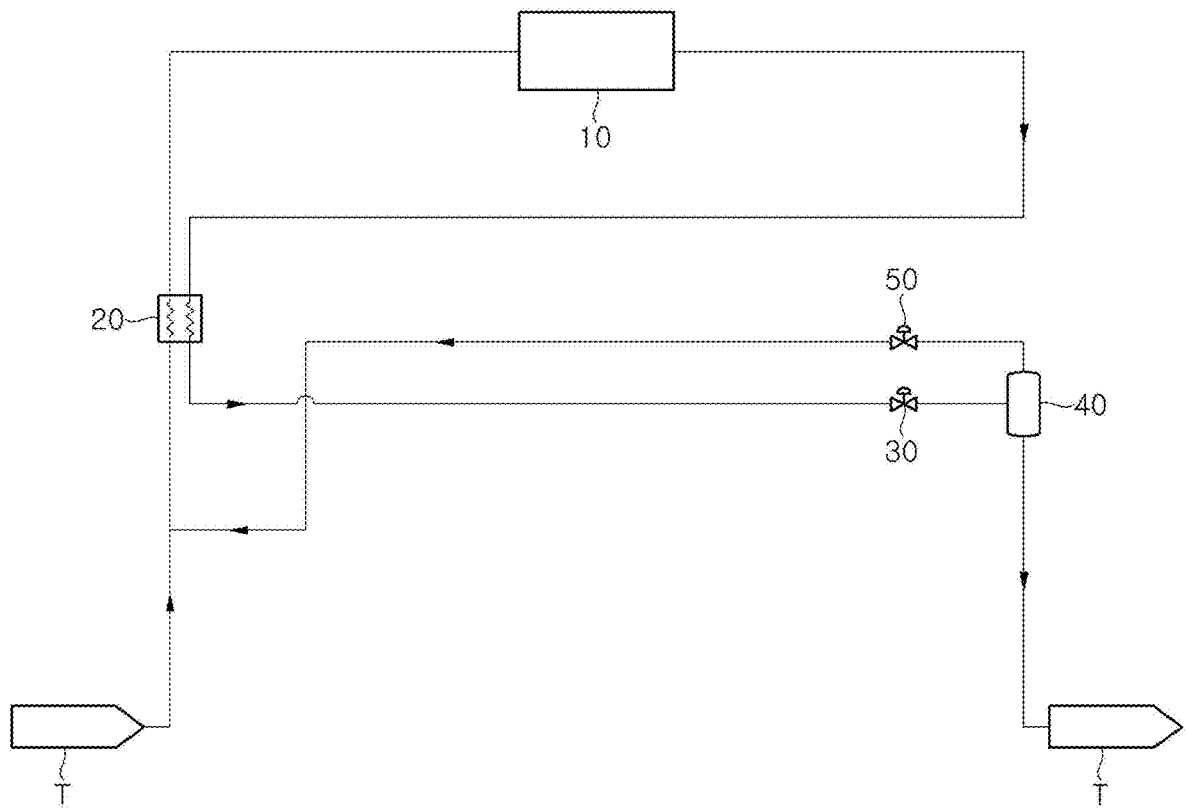

[FIG 2]
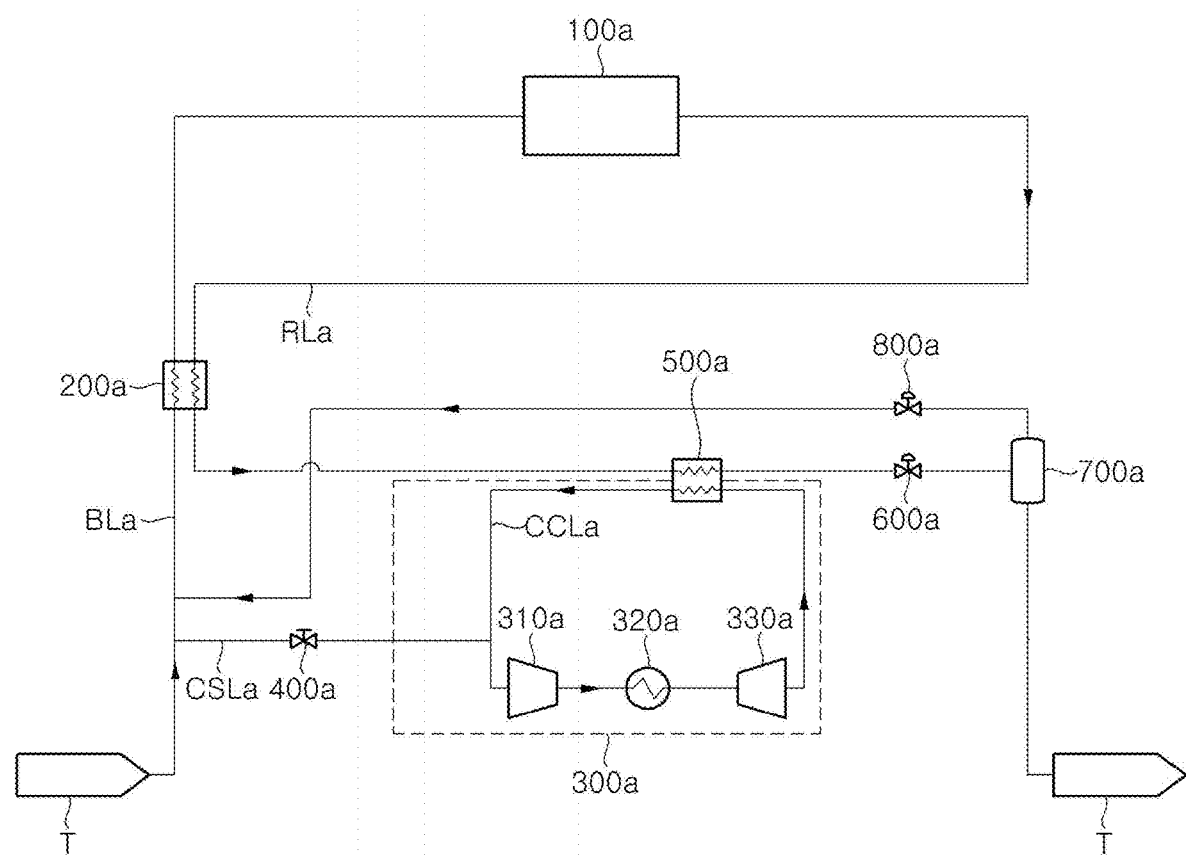

[FIG 3]
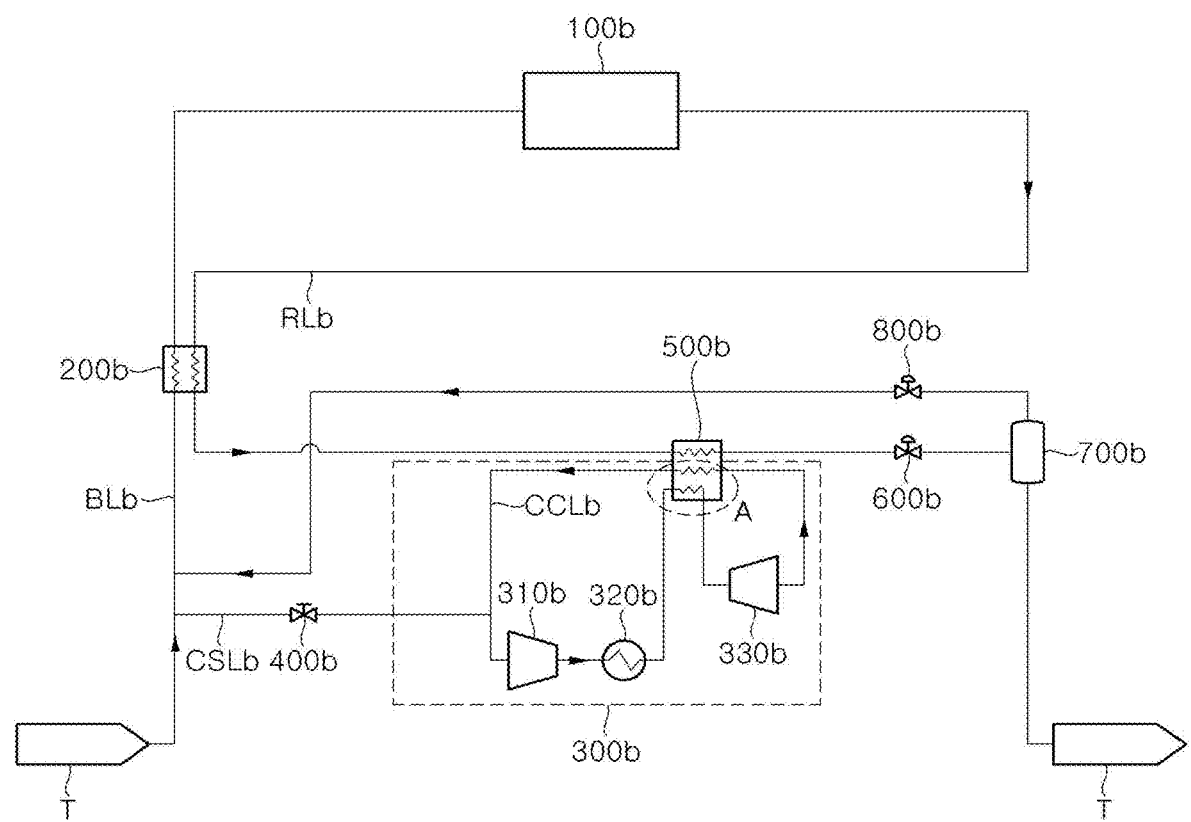

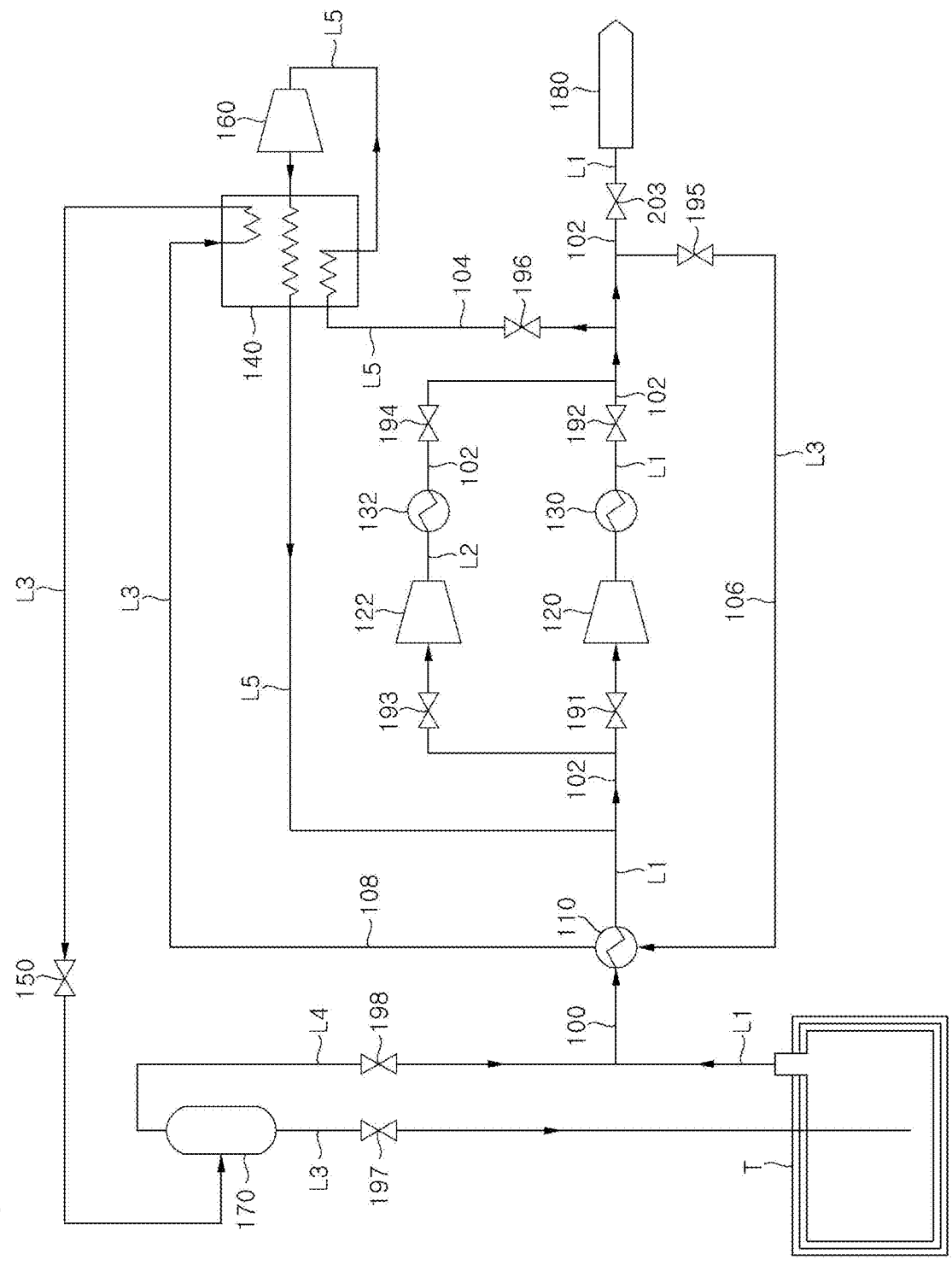
[FIG 4]

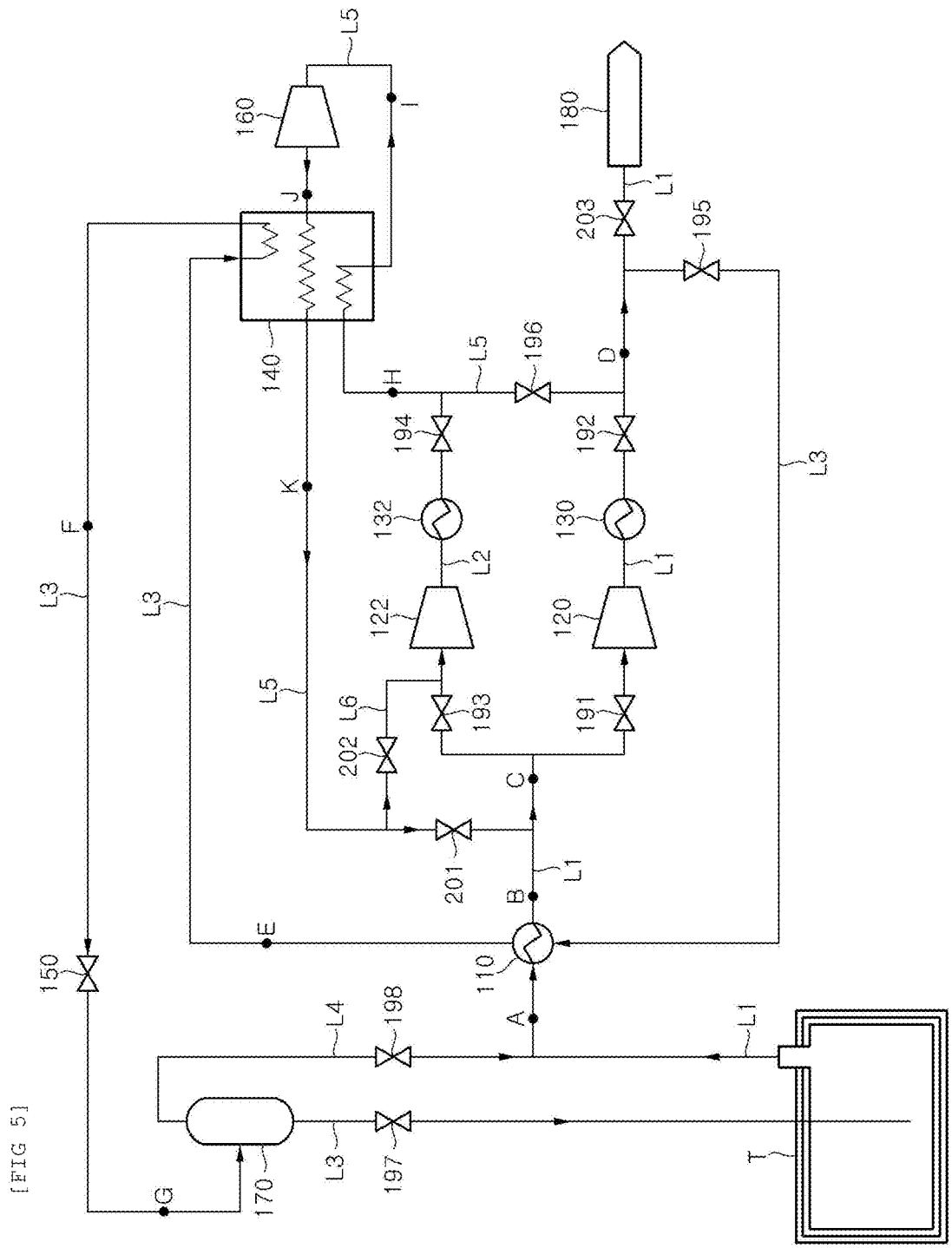
[FIG 5]

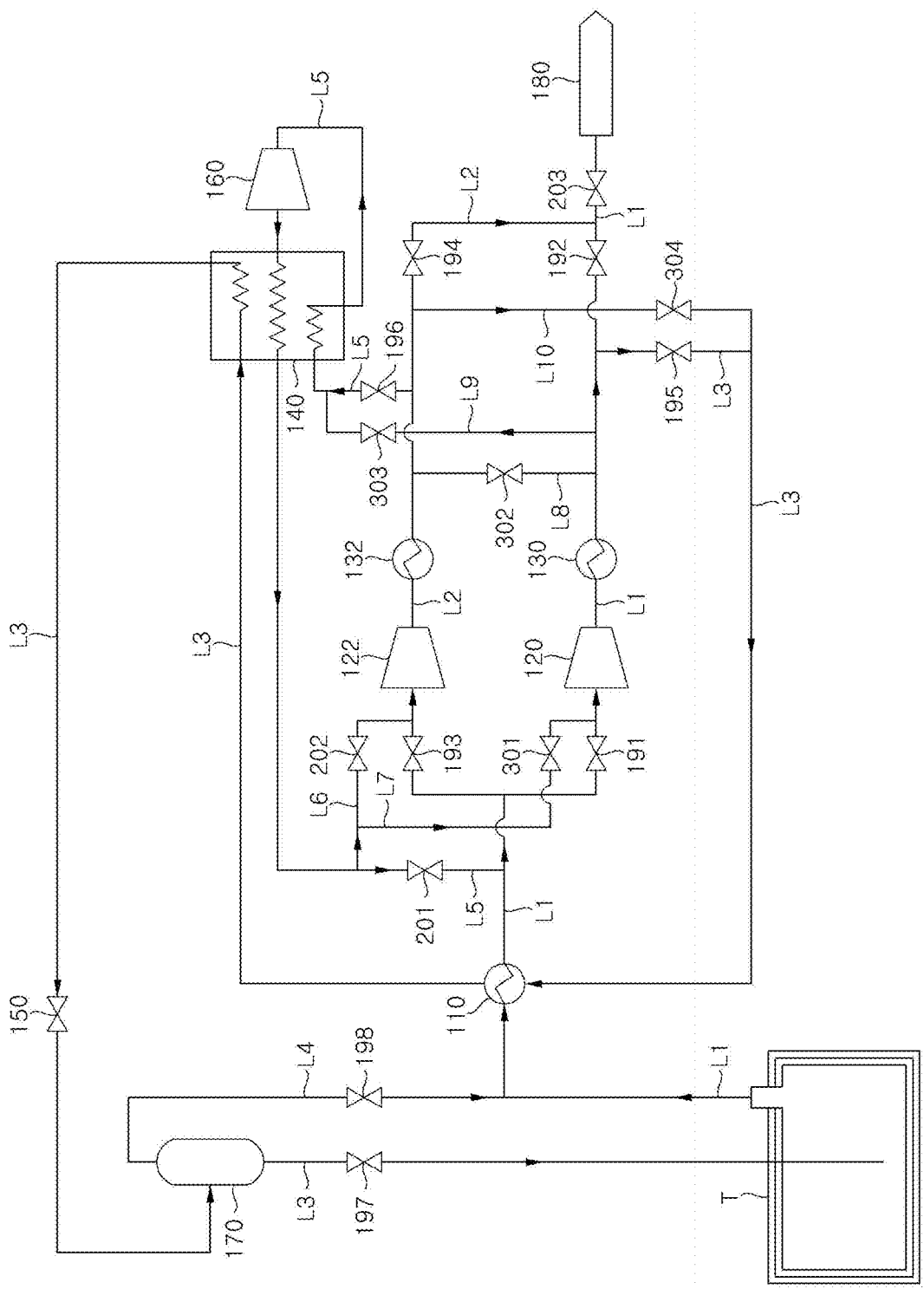
[FIG 6]

[FIG 7]
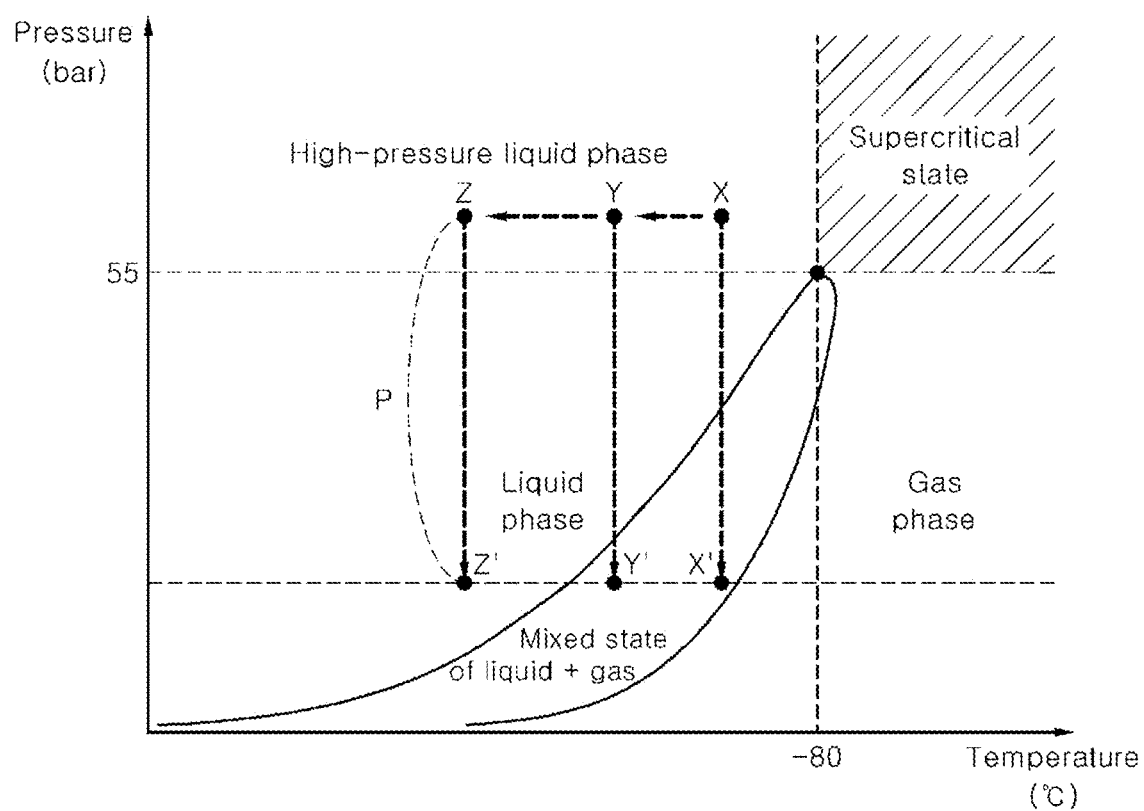

SHIP

TECHNICAL FIELD

The present invention relates to a ship, and more particularly, to a ship including a system for re-liquefying boil-off gas left after being used as fuel of an engine among boil-off gases generated in a storage tank.

BACKGROUND ART

In recent years, consumption of liquefied gas such as liquefied natural gas (LNG) has been rapidly increasing worldwide. Since a volume of liquefied gas obtained by liquefying gas at a low temperature is much smaller than that of gas, the liquefied gas has an advantage of being able to increase storage and transport efficiency. In addition, the liquefied gas, including liquefied natural gas, can remove or reduce air pollutants during the liquefaction process, and therefore may also be considered as eco-friendly fuel with less emission of air pollutants during combustion.

The liquefied natural gas is a colorless transparent liquid obtained by cooling and liquefying methane-based natural gas to about −162° C., and has about 1/600 less volume than that of natural gas. Therefore, to very efficiently transport the natural gas, the natural gas needs to be liquefied and transported.

However, since the liquefaction temperature of the natural gas is a cryogenic temperature of −162° C. at normal pressure, the liquefied natural gas is sensitive to temperature change and easily boiled-off. As a result, the storage tank storing the liquefied natural gas is subjected to a heat insulating process. However, since external heat is continuously sent to the storage tank, boil-off gas (BOG) is generated as the liquefied natural gas is continuously vaporized naturally in the storage tank during transportation of the liquefied natural gas. This goes the same for other low-temperature liquefied gases such as ethane.

The boil-off gas is a kind of loss and is an important problem in transportation efficiency. In addition, if the boil-off gas is accumulated in the storage tank, an internal pressure of the tank may rise excessively, and if the internal pressure of the tank becomes more severe, the tank is highly likely to be damaged. Accordingly, various methods for treating the boil-off gas generated in the storage tank have been studied. Recently, to treat the boil-off gas, a method for re-liquefying boil-off gas and returning the re-liquefied boil-off gas to the storage tank, a method for using boil-off gas as an energy source for fuel consumption places like an engine of a ship, or the like have been used.

As the method for re-liquefying boil-off gas, there are a method for re-liquefying boil-off gas by heat-exchanging the boil-off gas with a refrigerant by a refrigeration cycle using a separate refrigerant, a method for re-liquefying boil-off gas by the boil-off gas itself as a refrigerant without using a separate refrigerant, or the like. In particular, the system employing the latter method is called a partial re-liquefaction System (PRS).

Generally, on the other hand, as engines which can use natural gas as fuel among engines used for a ship, there are gas fuel engines such as a DFDE engine and an ME-GI engine.

The DFDE engine adopts an Otto cycle which consists of four strokes and injects natural gas with a relatively low pressure of approximately 6.5 bars into an combustion air inlet and compresses the natural gas as the piston lifts up.

The ME-GI engine adopts a diesel cycle which consists of two strokes and employs a diesel cycle which directly injects high pressure natural gas near 300 bars into the combustion chamber around a top dead point of the piston. Recently, there is a growing interest in the ME-GI engine, which has better fuel efficiency and boost efficiency.

DISCLOSURE

Technical Problem

An object of the present invention is to provide a ship including a system capable of providing better boil-off gas re-liquefying performance than the existing partial re-liquefaction system.

Technical Solution

According to an exemplary embodiment of the present invention, there is provided a ship including a storage tank storing liquefied gas, including: a boil-off gas heat exchanger which is installed on a downstream of a storage tank and heat-exchanges a compressed boil-off gas (hereafter referred to as "a first fluid") by a boil-off gas discharged from the storage tank as a refrigerant to cool the boil-off gas; a compressor which is installed on a downstream of the boil-off gas heat exchanger and compresses a part of the boil-off gas discharged from the storage tank; an extra compressor which is installed on a downstream of the boil-off gas heat exchanger and in parallel with the compressor and compresses the other part of the boil-off gas discharged from the storage tank; a refrigerant heat exchanger which additionally cools the first fluid which has been cooled by the boil-off gas heat exchanger; a refrigerant decompressing device which expands a second fluid, which is sent to the refrigerant heat exchanger (a fluid sent to the refrigerant heat exchanger hereafter being referred to as "a second fluid") and cooled by the refrigerant heat exchanger, and then sends the second fluid back to the refrigerant heat exchanger; and a first decompressing device which expands the first fluid that has been cooled by the boil-off gas heat exchanger and the refrigerant heat exchanger, wherein the refrigerant heat exchanger heat-exchanges and cools both the first fluid and second fluid by the boil-off gas, which passes through the refrigerant decompressing device, as a refrigerant, wherein the first fluid is either the boil-off gas which is compressed by the compressor or a confluent flow of the boil-off gas compressed by the compressor and the boil-off gas compressed by the extra compressor, and the second fluid is either the boil-off gas which is compressed by the extra compressor or a confluent flow of the boil-off gas compressed by the compressor and the boil-off gas compressed by the extra compressor.

The ship may further include a gas-liquid separator that separates the partially re-liquefied liquefied gas passing through the boil-off gas heat exchanger, the refrigerant heat exchanger, and the first decompressing device and the boil-off gas remaining in a gas phase, in which the liquefied gas separated by the gas-liquid separator may be sent to the storage tank, and the boil-off gas separated by the gas-liquid separator may be sent to the boil-off gas heat exchanger.

The first fluid may be branched into two flows on an upstream of a fuel consumption place, and a part of the first fluid may sequentially pass through the boil-off gas heat exchanger, the refrigerant heat exchanger, and the first decompressing device and may be partially or totally re-liquefied and the other part thereof may be sent to the fuel consumption place.

The second fluid which is compressed by the extra compressor, passes through the refrigerant heat exchanger and the refrigerant decompressing device, and is then used as the refrigerant of the refrigerant heat exchanger may be sent back to the extra compressor to form a refrigerant cycle of a closed loop in which the extra compressor, the refrigerant heat exchanger, the refrigerant decompressing device, and the refrigerant heat exchanger are connected.

The second fluid which is compressed by the extra compressor, passes through the refrigerant heat exchanger and the refrigerant decompressing device, and is then used as the refrigerant in the refrigerant heat exchanger may be joined with the boil-off gas discharged from the storage tank and then passing the boil-off gas heat exchanger.

The ship may further include a valve installed on a line along which the first fluid and the second fluid communicate with each other, and the valve may be opened/closed to join or separate the boil-off gas compressed by the compressor and the boil-off gas compressed by the extra compressor.

The refrigerant decompressing device may be an expander, and the fluid just before passing through the refrigerant decompressing device and the fluid just after passing through the refrigerant decompressing device may be a gas phase.

According to another exemplary embodiment of the present invention, there is provided a boil-off gas treatment system for a ship including a storage tank for storing a liquefied gas, including: a first supply line along which boil-off gas, which is discharged from the storage tank and partially compressed by a compressor, is sent to a fuel consumption place; a second supply line which is branched from the first supply line and has an extra compressor provided thereon, with the extra compressor compressing the other part of the boil-off gas discharged from the storage tank; a return line which is branched from the first supply line and has a boil-off gas heat exchanger, a refrigerant heat exchanger, and a first decompressing device provided thereon, with the compressed boil-off gas being re-liquefied by passing through the boil-off gas heat exchanger, the refrigerant heat exchanger, and the first decompressing device; a recirculation line which has the refrigerant heat exchanger and a refrigerant decompressing device provided thereon, with the boil-off gas, which is cooled by passing through the refrigerant heat exchanger and a refrigerant decompressing device, being sent back to the refrigerant heat exchanger to be used as a refrigerant and then joined with the boil-off gas discharged from the storage tank; a first additional line which connects between the recirculation line on a downstream of the refrigerant decompressing device and the refrigerant heat exchanger and a second supply line on an upstream of the extra compressor; an second additional line which connects the first additional line with the first supply line on the upstream of the compressor; a third additional line which connects the first supply line on the downstream of the compressor and the second supply line on the downstream of the extra compressor; a fourth additional line which connects the first supply line on the downstream of the compressor with the recirculation line on the upstream of the refrigerant heat exchanger and the refrigerant decompressing device; and a fifth additional line which connects the second supply line on a downstream of the extra compressor with the return line on an upstream of the boil-off gas heat exchanger, in which the boil-off gas heat exchanger heat-exchanges and cools the boil-off gas supplied along the return line by the boil-off gas discharge from the storage tank as the refrigerant, and the refrigerant heat exchanger heat-exchanges and cools both of the boil-off gas supplied along the recirculation line and the boil-off gas supplied along the return line by the boil-off gas passing through the refrigerant decompressing device as the refrigerant.

The boil-off gas treatment system may further include: a first valve which is installed on the first supply on the upstream of the compressor; a second valve which is installed on the first supply line on the downstream of the compressor; a third valve which is installed on the second supply line on the upstream of the extra compressor; a fourth valve which is installed on the second supply line on the downstream of the extra compressor; a fifth valve which is installed on the return line on the upstream of the boil-off gas heat exchanger; a sixth valve which is installed on the recirculation line on the upstream of the refrigerant decompressing device and the refrigerant heat exchanger; a ninth valve which is installed on the recirculation line on the downstream of the refrigerant decompressing device and the refrigerant heat exchanger; a tenth valve which is installed on the first additional line; a twelfth valve which is installed on the second additional line; a thirteenth valve which is installed on the third additional line; a fourteenth valve which is installed on the fourth additional line; and a fifteenth valve which is installed on the fifth additional line.

The boil-off gas treatment system may further include an eleventh valve which is installed on the first supply line on an upstream of the fuel consumption place and downstream of the second supply line.

The system may be operated while the first valve, the second valve, the third valve, the fifth valve, the sixth valve, and the tenth valve are open and the fourth valve, the ninth valve, the twelfth valve, the thirteenth valve, the fourteenth valve, and the fifteenth valve are closed, and if the boil-off gas is supplied to the extra compressor, the third valve may be closed to form the refrigerant cycle of the closed loop in which the boil-off gas circulates the extra compressor, the sixth valve, the refrigerant heat exchanger, the refrigerant decompressing device, the refrigerant heat exchanger, and the tenth valve.

If the compressor fails, the first valve, the second valve, the fifth valve, the sixth valve, and the tenth valve may be closed and the third valve and the fourth valve may open to supply the boil-off gas, which is discharged from the storage tank and then passes through the boil-off gas heat exchanger, to the fuel consumption place via the third valve, the extra compressor, and the fourth valve.

The system may be operated while the first valve, the third valve, the fourth valve, the twelfth valve, the fourteenth valve, and the fifteenth valve may be open and the second valve, the fifth valve, the sixth valve, the ninth valve, the tenth valve, and the thirteenth valve may be closed, and if the boil-off gas is supplied to the compressor, the first valve may be closed to form the refrigerant cycle of the closed loop in which the boil-off gas circulates the compressor, the fourteenth valve, the refrigerant heat exchanger, the refrigerant decompressing device, the refrigerant heat exchanger, and the twelfth valve.

If the extra compressor fails, the third valve, the fourth valve, the twelfth valve, the fourteenth valve, and the fifteenth valve may be closed and the first valve and the second valve may open to supply the boil-off gas, which is discharged from the storage tank and then passes through the boil-off gas heat exchanger, to the fuel consumption place via the first valve, the compressor, and the second valve.

The first valve, the second valve, the third valve, the fifth valve, the sixth valve, the ninth valve, and the thirteenth valve may be open and the fourth valve, the tenth valve, the twelfth valve, the fourteenth valve, and the fifteenth valve may be closed such that the boil-off gas compressed by the compressor and the boil-off gas compressed by the extra compressor are joined and operated.

If the compressor fails, the first valve, the fifth valve, the sixth valve, and the ninth valve may be closed to supply the boil-off gas, which is discharged from the storage tank and then passes through the boil-off gas heat exchanger, to the fuel consumption place via the third valve, the extra compressor, the thirteenth valve, and the second valve.

The first valve, the second valve, the third valve, the fifth valve, the sixth valve, and the ninth valve may be open and the fourth valve, the tenth valve, the twelfth valve, the thirteenth valve, the fourteenth valve, and the fifteenth valve may be closed so that the boil-off gas compressed by the compressor and the boil-off gas compressed by the extra compressor may be separated and operated.

If the compressor fails, the first valve, the fifth valve, the sixth valve, and the ninth valve may be closed and the thirteenth valve may be open to supply the boil-off gas, which is discharged from the storage tank and then passes through the boil-off gas heat exchanger, to the fuel consumption place via the third valve, the extra compressor, the thirteenth valve, and the second valve.

According to another exemplary embodiment of the present invention, there is provided an method including: branching boil-off gas, which is discharged from a liquefied gas storage tank, into two to allow a compressor or an extra compressor to compress the boil-off gas of the branched two flows; sending at least one of the boil-off gas compressed by the compressor and the boil-off gas compressed by the extra compressor to a fuel consumption place or re-liquefying the at least one boil-off gas to return the at least one boil-off gas (hereinafter, referred to as 'returning boil-off gas') to the storage tank or re-circulate the at least one boil-off gas (hereinafter, referred to as 're-circulated boil-off gas'); exchanging heat between the returning boil-off gas and the boil-off gas discharged from the storage tank to be cooled and then exchanging heat with the re-circulated boil-off gas to be additionally cooled; and cooling and expanding the re-circulated boil-off gas and then exchanging heat between the cooled and expanded re-circulated boil-off gas and the returning boil-off gas.

The downstream line of the compressor and the downstream line of the extra compressor may be connected to each other to join the boil-off gas compressed by the compressor with the boil-off gas compressed by the extra compressor.

Advantageous Effects

Compared with the existing partial re-liquefaction system (PRS), the present invention can increase the re-liquefaction efficiency and the re-liquefaction amount since the boil-off gas is decompressed after undergoing the additional cooling process by the refrigerant heat exchanger. In particular, most or all of the remaining boil-off gas can be re-liquefied without employing the refrigeration cycle using the separate refrigerant, and therefore increasing the economical efficiency.

Further, according to the present invention, it is possible to flexibly control the refrigerant flow rate and the supply of cold heat in response to the discharge amount of the boil-off gas, the engine load depending on the operating speed of the ship, and the like.

According to the embodiment of the present invention, it is possible to contribute to securing the space on the ship and save the cost of additionally installing the compressor by increasing the re-liquefaction efficiency and the re-liquefaction amount by using the extra compressor already provided. In particular, the refrigerant heat exchanger can use not only the boil-off gas compressed by the extra compressor but also the boil-off gas compressed by the compressor as the refrigerant to increase the flow rate of the boil-off gas used as the refrigerant in the refrigerant heat exchanger, thereby more increasing the re-liquefaction efficiency and the re-liquefaction amount.

BRIEF DESCRIPTION OF THE DRAWINGS

FIG. 1 is a configuration diagram schematically showing the existing partial re-liquefaction system.

FIG. 2 is a configuration diagram schematically showing a boil-off gas treatment system for a ship according to a first embodiment of the present invention.

FIG. 3 is a configuration diagram schematically showing a boil-off gas treatment system for a ship according to a second embodiment of the present invention.

FIG. 4 is a configuration diagram schematically showing a boil-off gas treatment system for a ship according to a third embodiment of the present invention.

FIG. 5 is a configuration diagram schematically showing a boil-off gas treatment system for a ship according to a fourth embodiment of the present invention.

FIG. 6 is a configuration diagram schematically showing a boil-off gas treatment system for a ship according to a fifth embodiment of the present invention.

FIG. 7 is a graph schematically illustrating a phase change of methane depending on temperature and pressure.

BEST MODE

Hereinafter, configurations and effects of exemplary embodiments of the present invention will be described with reference to the accompanying drawings. The present invention can variously be applied to ships such as a ship equipped with an engine using natural gas as fuel and a ship including a liquefied gas storage tank. In addition, the following embodiments may be changed in various forms, and therefore the technical scope of the present invention is not limited to the following embodiments.

Boil-off gas systems of the present invention to be described below can be applied to offshore structures such as LNG FPSO and LNG FSRU, in addition to all types of ships and offshore structures equipped with a storage tank capable of storing a low-temperature fluid cargo or liquefied gas, i.e., ships such as a liquefied natural gas carrier, a liquefied ethane gas carrier, and LNG RV. However, for convenience of explanation, the following embodiments will describe, by way of example, liquefied natural gas which is a typical low-temperature fluid cargo.

Further, a fluid on each line of the present invention may be in any one of a liquid phase, a gas-liquid mixed state, a gas phase, and a supercritical fluid state, depending on operating conditions of a system.

FIG. 1 is a configuration diagram schematically showing the existing partial re-liquefaction system.

Referring to FIG. 1, in the conventional partial re-liquefaction system, the boil-off gas generated and discharged from a storage tank storing a fluid cargo is sent along a pipe and compressed by a boil-off gas compressor 10.

A storage tank T is provided with a sealing and heat insulating barrier to be able to store liquefied gas such as liquefied natural gas at a cryogenic temperature. However, the sealing and heat insulating barrier may not completely shut off heat transmitted from the outside. Therefore, the liquefied gas is continuously evaporated in the storage tank, so an internal pressure of the storage tank may be increased. Accordingly, to prevent the pressure of the tank from excessively increasing due to the boil-off gas and keep the internal pressure of the tank at an appropriate level, the boil-off gas in the storage tank is discharged and is then supplied to the boil-off compressor 10.

When the boil-off gas discharged from the storage tank and compressed by the boil-off gas compressor 10 is referred to as a first stream, the first flow of the compressed boil-off gas is divided into a second flow and a third stream, and the second flow may be formed to be liquefied and then return to the storage tank T, and the third flow may be formed to be supplied to gas fuel consumption places such as a boost engine and a power generation engine in a ship. In this case, in the boil-off gas compressor 10 can compress the boil-off gas to a supply pressure of the fuel consumption place, and the second flow may be branched via all or a part of the boil-off gas compressor if necessary. All of the boil-off gas compressed as the third flow may also be supplied according to the amount of fuel required for the fuel consumption place, and all of the compressed boil-off gas may return to the storage tank by supplying the whole amount of boil-off gas as the second stream. An example of the gas fuel consumption places may include a DF generator, a gas turbine, DFDE, and the like, in addition to high pressure gas injection engine (e.g., ME-GI engines developed by MDT Co., etc.) and low-temperature gas injection engines (e.g., generation X-dual fuel engine (X-DF engine) by Wartsila Co.).

At this time, a heat exchanger 20 is provided to liquefy the second flow of the compressed boil-off gas. The boil-off gas generated from the storage tank is used as a cold heat supply source of the compressed boil-off gas. The compressed boil-off gas, that is, the second stream, whose temperature rises while being compressed by the boil-off gas compressor while passing through the heat exchanger 20 is cooled, and the boil-off gas generated from the storage tank and introduced into the heat exchanger 20 is heated and then supplied to the boil-off gas compressor 10.

Since a flow rate of pre-compressed boil-off gas is compressed is greater than that of the second stream, the second flow of the compressed boil-off gas may be at least partially liquefied by receiving cold heat from the boil-off gas before being compressed. As described above, the heat exchanger exchanges heat the low-temperature boil-off gas immediately after being discharged from the storage tank with the high-pressure boil-off gas compressed by the boil-off gas compressor to liquefy the high-pressure boil-off gas.

The boil-off gas of the second flow passing through the heat exchanger 20 is further cooled while being decompressed by passing through an expansion means 30 such as an expansion valve or an expander and is then supplied to a gas-liquid separator 40. The gas-liquid separator 40 separates the liquefied boil-off gas into gas and liquid components. The liquid component, that is, the liquefied natural gas returns to the storage tank, and the gas component, that is, the boil-off gas is discharged from the storage tank to be joined with a flow of boil-off gas supplied to the heat exchanger 20 and the boil-off gas compressor 10 or is then supplied back to the heat exchanger 20 to be utilized as a cold heat supply source which heat-exchanges high-pressure boil-off gas compressed by the boil-off gas compressor 10. Of course, the boil-off gas may be sent to a gas combustion unit (GCU) or the like to be combusted or may be sent to a gas consumption place (including a gas engine) to be consumed. Another expansion means 50 for additionally decompressing the gas separated by the gas-liquid separator before being joined with the flow of boil-off gas may be further provided.

FIG. 2 is a configuration diagram schematically showing a boil-off gas treatment system for a ship according to a first embodiment of the present invention.

Referring to FIG. 2, the system of the present embodiment includes a refrigerant circulator 300a which is supplied with boil-off gas generated from a low temperature fluid cargo stored in a storage tank and circulates the boil-off gas as a refrigerant.

To this end, the system includes a refrigerant supply line CSLa which supplies boil-off gas from the storage tank to a refrigerant circulator 300a. The refrigerant supply line is provided with a valve 400a to shut off the refrigerant supply line CSLa if a sufficient amount of boil-off gas, which may circulate the refrigerant circulator, is supplied, such that the refrigerant circulator 300a is operated as a closed loop.

Similar to the above-described basic embodiment, even in the first modified embodiment, the compressor 100a for compressing the boil-off gas generated from the low-temperature fluid cargo in the storage tank T is also provided. The boil-off gas generated from the storage tank is introduced into the compressor 100a along a boil-off gas supply line BLa.

The storage tank (T) of the present embodiment may be an independent type tank in which a load of the fluid cargo is not directly applied to a heat insulating layer, or a membrane type tank in which the load of the cargo is directly applied to the heat insulating layer. The independent type tank can be used as a pressure vessel which is designed to withstand a pressure of 2 barg or more.

Meanwhile, in the present embodiment, only a line for re-liquefying the boil-off gas is shown. However, the boil-off gas compressed by the compressor may be supplied as fuel to a fuel consumption place including a boost engine and a power generation engine of a ship or an offshore structure. When a ship is anchored, there is little or no consumption of gas fuel, the whole amount of boil-off gas may also be supplied to a re-liquefaction line RLa.

The compressed boil-off gas is supplied to a boil-off gas heat exchanger 200a along the boil-off gas re-liquefaction line RLa. The boil-off gas heat exchanger 200a is provided over the boil-off gas re-liquefaction line RLa and the boil-off gas supply line BLa to exchange heat between boil-off gas introduced into the compressor 100a and the boil-off gas compressed by at least a part of the compressor. The boil-off gas whose temperature rises during the compression is cooled through the heat exchange with the low-temperature boil-off gas which is generated from the storage tank and is to be introduced into the compressor 100a.

A downstream of the boil-off gas heat exchanger 200a is provided with a refrigerant heat exchanger 500a. The boil-off gas, which is compressed and then heat-exchanged by the boil-off gas heat exchanger is additionally cooled by the heat exchange with the boil-off gas which circulates the refrigerant circulator 300a.

The refrigerant circulator 300a includes a refrigerant compressor 310a which compresses the boil-off gas supplied from the storage tank, a cooler 320a which cools the boil-off gas compressed by the refrigerant compressor, and a refrigerant decompressing device 330a which decompresses and additionally cools the boil-off gas cooled by the cooler. The refrigerant decompressing device 330a may be an expansion valve or an expander which adiabatically expands and cools the boil-off gas.

The boil-off gas cooled by the refrigerant decompressing device 330a is supplied as a refrigerant to the refrigerant heat exchanger 500a along the refrigerant circulation line CCLa. The refrigerant heat exchanger 500a cools the boil-off gas by the heat exchange with the boil-off gas supplied via the boil-off gas heat exchanger 200a. The boil-off gas of the refrigerant circulation line CCLa passing through the refrigerant heat exchanger 500a is circulated to the refrigerant compressor 310a and circulates the refrigerant circulation line while undergoing the above-described compression and cooling processes.

Meanwhile, the boil-off gas of the boil-off gas re-liquefaction line RLa cooled by the refrigerant heat exchanger 500a is decompressed by a first decompressing device 600a. The first decompressing device 600a may be an expansion valve, such as a Joule-Thomson valve, or an expander.

The decompressed boil-off gas is separated into gas and liquid by being supplied to a gas-liquid separator 700a on a downstream of the first decompressing device 600a, and the liquid separated by the gas-liquid separator 700a, that is, the liquefied natural gas is supplied to the storage tank T and again stored.

The gas separated by the gas-liquid separator 700a, that is, the boil-off gas is additionally decompressed by a second decompressing device 800a, and is joined with the flow of boil-off gas to be introduced into the boil-off gas heat exchanger 200a from the storage tank T or is supplied to the boil-off gas heat exchanger 200a to be utilized as the cold heat supply source which heat-exchanges a high-pressure boil-off gas compressed by the compressor 100a. Of course, the boil-off gas may be sent to a gas combustion unit (GCU) or the like to be combusted or may be sent to a fuel consumption place (including a gas engine) to be consumed.

FIG. 3 is a configuration diagram schematically showing a boil-off gas treatment system for a ship according to a second embodiment of the present invention.

Referring to FIG. 3, according to the present embodiment, in a refrigerant circulator 300b, the boil-off gas which is to be introduced into a refrigerant decompressing device 330b from a cooler 320b is cooled by exchanging heat with the boil-off gas decompressed by the refrigerant decompressing device 330b and then supplied to the refrigerant decompressing device 330b.

Since the boil-off gas is cooled while being decompressed by the refrigerant decompressing device 330b, the boil-off gas downstream of the refrigerant decompressing device has temperature lower than that of the boil-off gas upstream of the refrigerant decompressing device. In this regard, according to the present embodiment, the boil-off gas upstream of the refrigerant decompressing device is cooled by exchanging heat with the boil-off gas downstream of the refrigerant decompressing device and then introduced into the decompressing device. To this end, as illustrated in FIG. 3, the boil-off gas upstream of the refrigerant decompressing device 330b may be supplied to the refrigerant heat exchanger 500b (portion A of FIG. 3). If necessary, a separate heat exchanging device which may exchange heat between the boil-off gases upstream and downstream of the refrigerant decompressing device may be additionally provided.

As described above, the system of the present embodiments can re-liquefy and store the boil-off gas generated from the storage tank fluid cargo, thereby increasing the transportation rate of the fluid cargo. In particular, even when the consumption of fuel on the in-ship gas consumption places is small, the gas can be combusted by the gas combustion unit (GCU) or the like to prevent the pressure of the storage tank from increasing to reduce or eliminate the amount of wasted cargo, thereby preventing a waste of energy.

In addition, the boil-off gas is circulated as the refrigerant to be utilized as the cold heat source for re-liquefaction, thereby effectively re-liquefying the boil-off gas without configuring the separate refrigerant cycle, and the separate refrigerant need not be supplied to contribute to securing the in-ship space and increase the economical efficiency. In addition, if the refrigerant is insufficient in the refrigerant cycle, the refrigerant may be replenished from the storage tank to be smoothly replenished and the refrigerant cycle may be effectively operated.

As described above, the boil-off gas may be re-liquefied by using the cold heat of the boil-off gas itself in multiple steps, so that the system configuration for treating the in-ship boil-off gas can be simplified and the cost required to install and operate the apparatus for complicated boil-off gas treatment can be saved.

FIG. 4 is a configuration diagram schematically showing a boil-off gas treatment system for a ship according to a third embodiment of the present invention.

Referring to FIG. 4, the ship of the present embodiment includes: a boil-off gas heat exchanger 110 which is provided downstream of the storage tank T; a compressor 120 and an extra compressor 122 which are installed on a downstream of the boil-off gas heat exchanger 110 to compress boil-off gas discharged from the storage tank T; a cooler 130 which lowers temperature of the boil-off gas compressed by the extra compressor 120; an extra cooler 132 which lowers the temperature of the boil-off gas compressed by the extra compressor 122; a first valve 191 which is provided upstream of the compressor 120; a second valve 192 which is provided downstream of the cooler 130; a third valve 193 which is provided upstream of the extra compressor 122; a fourth valve 194 which is provided downstream of the extra cooler 132; a refrigerant heat exchanger 140 which additionally cools the boil-off gas cooled by the boil-off gas heat exchanger 110; a refrigerant decompressing device 160 which expands the boil-off gas passing through the refrigerant heat exchanger 140 and then sends the expanded boil-off gas back to the refrigerant heat exchanger 140; and a first decompressing device 150 which expands the boil-off gas additionally cooled by the refrigerant heat exchanger 140.

The boil-off gas, which is naturally generated from the storage tank T and then discharged, is supplied to a fuel consumption source 180 along the first supply line L1. The boil-off gas heat exchanger 110 is installed on the first supply line L1 and recovers cold heat from the boil-off gas immediately after being discharged from the storage tank T. The ship of the present embodiment may further include an eleventh valve 203 which is installed upstream of the fuel consumption place 180 to control a flow rate of the boil-off gas sent to the fuel consumption place 180 and opening/closing thereof.

The boil-off gas heat exchanger 110 is supplied with the boil-off gas discharged from the storage tank T and uses the boil-off gas supplied to the boil-off gas heat exchanger 110 along the return line L3 as a refrigerant. The fifth valve 195 which controls the flow rate of the boil-off gas and opening/closing thereof may be installed on a return line L3.

The compressor 120 and the extra compressor 122 compress the boil-off gas passing through the boil-off gas heat exchanger 110. The compressor 120 is installed on the first supply line L1 and the extra compressor 122 is installed on the second supply line L2. The second supply line L2 is branched from the first supply line L1 on the upstream of the compressor 120 and connected to the first supply line L1 on the downstream of the compressor 120. In addition, the compressor 120 and the extra compressor 122 are installed in parallel, and may have the same performance.

In general, the ship is additionally provided with the extra compressor 122 and the extra cooler 132 for preparing for the case where the compressor 120 and the cooler 130 fail. Typically, the extra compressor 122 and the extra cooler 132 are not used at ordinary times when the compressor 120 or the cooler 130 does not fail.

That is, typically, at ordinary times when the compressor 120 or the cooler 130 does not fail, the third valve 193 on an upstream of the extra compressor 122 and the fourth valve 194 on a downstream of the extra cooler 132 are closed so that the boil-off gas is supplied to the fuel consumption place 180 via the compressor 120 and the cooler 130, and when the compressor 120 or the cooler 130 fails, the third valve 193 on the upstream of the extra compressor 122 and the fourth valve 194 on the downstream of the extra cooler 132 are open and the first valve 191 on the upstream of the compressor 120 and the second valve 192 on a downstream of the cooler 130 are closed so that the boil-off gas is supplied to the fuel consumption place 180 via the extra compressor 122 and the extra cooler 132.

The present invention is to increase the re-liquefaction efficiency and re-liquefaction amount of the boil-off gas by using the extra compressor 122 and the extra cooler 132 which are not used even if they are installed in the ship, and sends a part of the boil-off gas compressed by the extra compressor 122 to the fuel consumption place 180 and uses the other part of the boil-off gas as a refrigerant which additionally cools the boil-off gas in the refrigerant heat exchanger 140.

FIG. 7 is a graph schematically illustrating a phase change of methane depending on temperature and pressure. Referring to FIG. 7, methane becomes a supercritical fluid state at a temperature of approximately −80° C. or higher and a pressure of approximately 55 bars or higher. That is, in the case of methane, a critical point is approximately −80° C. and 55 bars. The supercritical fluid state is a third state different from a liquid phase or a gas phase.

On the other hand, if the supercritical fluid states has a temperature lower than the critical point at a pressure equal to or higher than the critical point, it may also be a state in which a density is high, unlike a general liquid phase. Here, the state of the boil-off gas having a pressure equal to or higher than the critical point and a temperature equal to lower than the critical point is referred to as a "high-pressure liquid phase".

The boil-off gas compressed by the compressor 120 or the extra compressor 122 may be in a gaseous state or in a supercritical fluid state depending on how much the boil-off gas is compressed.

When the boil-off gas sent to the boil-off gas heat exchanger 110 through the return line L3 is in a gas phase, the temperature of the boil-off gas is lowered while the boil-off gas passes through the boil-off gas heat exchanger 110, and thus the boil-off gas may be a mixed state of liquid and gas. In the case of the supercritical fluid state, the temperature of the boil-off gas is lowered while the boil-off gas passes through the boil-off gas heat exchanger 110 and thus the boil-off gas may be the "high-pressure liquid phase".

The temperature of the boil-off gas cooled by the boil-off gas heat exchanger 110 is further lowered while the boil-off gas passes through the refrigerant exchanger 140. When the boil-off gas passing through the boil-off gas heat exchanger 110 is in the mixed state of liquid and gas, the temperature of the boil-off gas is further lowered while the boil-off gas passes through the refrigerant heat exchanger 140 and thus the boil-off gas becomes the mixed state in which a ratio of liquid is higher or becomes the liquid phase and in the case of the "high-pressure liquid phase", the temperature of the boil-off gas is further lowered while the boil-off gas passes through the refrigerant heat exchanger 140.

Further, even when the boil-off gas which passes through the refrigerant heat exchanger 140 is in the "high-pressure liquid phase", the pressure of the boil-off gas is lowered while the boil-off gas passes through the first decompressing device 150, and thus the boil-off gas becomes low in a liquid phase or the mixed state of liquid and gas.

It can be appreciated that even if the pressure of the boil-off gas is lowered to the same level (P in FIG. 7) by the first decompressing device 150, the boil-off gas becomes the mixed state in which the ration of the liquid is higher in the case where the boil-off gas is decompressed in the higher temperature (X→X' in FIG. 7) than in the case where the boil-off gas is decompressed in the lower temperature (Y→Y' in FIG. 7). Further, it can be appreciated that if the temperature may be further lowered, the boil-off gas can theoretically be re-liquefied 100% (Z→Z' in FIG. 7). Therefore, if the boil-off gas is cooled once more by the refrigerant heat exchanger 140 before passing through the first decompressing device 150, the re-liquefaction efficiency and the liquefaction amount can be increased.

Referring back to FIG. 4, compared with the first and second embodiments in which the refrigerant circulators 300a and 300b for additionally cooling the boil-off gas are configured as the closed loop, the present embodiment is different from the first and second embodiments in that the refrigerant cycle is configured as the open loop.

In the first and second embodiments, the refrigerant circulators 300a and 300b are configured as the closed loop, and thus the boil-off gas compressed by the refrigerant compressors 310a and 310b is used only as a refrigerant in the refrigerant heat exchangers 500a and 500b but may not be sent to the fuel consumption place or may not undergo the re-liquefaction process.

On the other hand, in the present embodiment, the refrigerant cycle is configured as the open loop, and thus the boil-off gas compressed by the extra compressor 122 is joined with the boil-off gas compressed by the compressor 120, and then a part of the joined boil-off gas is sent to the fuel consumption place 180, the other part thereof is used as the refrigerant in the refrigerant heat exchanger 140 along the recirculation line L5, and the remaining part thereof undergoes the re-liquefaction process along the return line L3.

The recirculation line L5 is a line which is branched from the first supply line L1 on the downstream of the compressor 120 and connected to the first supply line L1 on the upstream of the compressor 120. A sixth valve 196 which controls the flow rate of the boil-off gas and the opening/closing thereof may be installed on the recirculation line L5 along which the boil-off gas branched from the first supply line L1 is sent to the refrigerant heat exchanger 140.

Compared with the first and second embodiments in which the refrigerant cycle is configured as the closed loop, the present embodiment in which the refrigerant cycle is configured as the open loop is greatly different from the first and second embodiments in that the downstream line of the compressor 120 and the downstream line of the extra compressor 122 are connected. That is, in the present embodiment, the second supply line L2 on the downstream of the extra compressor 122 is connected to the first supply line L1 on the downstream of the compressor 120, and thus the boil-off gas compressed by the extra compressor 122 is joined with the boil-off gas compressed by the compressor 120 and then sent to the refrigerant heat exchanger 140, the fuel consumption place 180, or the boil-off gas heat exchanger 110. The present embodiment includes all other modifications in which the downstream of the compressor 120 and the downstream line of the extra compressor 122 are connected.

Therefore, according to the present embodiment, upon the increase in the demanded amount of the fuel consumption place 180 such as the increase in the operating speed of the ship, the boil-off gas compressed by the extra compressor 122 as well as the boil-off gas compressed by the compressor 120 as well as the compressed may be sent to the fuel consumption place 180.

Generally, however, since the compressor 120 and the extra compressor 122 are designed to have a capacity of approximately 1.2 times the amount required in the fuel consumption place 180, the case in which the boil-off gas compressed by the extra compressor 122 exceeding the capacity of the compressor 120 is sent to the fuel consumption place 180 little occurs. Rather, since the boil-off gas discharged from the storage tank T are entirely not consumed in the fuel consumption place 180 and therefore the boil-off gas to be re-liquefied increases, the case in which a large amount of refrigerant is required to re-liquefy a large amount of boil-off gas is more frequent.

According to the present embodiment, since not only the boil-off gas compressed by the compressor 120 but also the boil-off gas compressed by the extra compressor 122 may be used as the refrigerant for the heat exchange in the refrigerant heat exchanger 140, the boil-off gas supplied to the refrigerant heat exchanger 140 along the return line L3 after passing through the boil-off gas heat exchanger 110 may be cooled to a lower temperature by using more refrigerant and the overall re-liquefaction efficiency and re-liquefaction amount may be increased. Theoretically, 100% re-liquefaction is possible.

Generally, upon determining the capacity of the compressors 120 and 122 provided in the ship, both of the capacity required for supplying the boil-off gas to the fuel consumption place 180 and the capacity required for re-liquefying the boil-off gas remaining by being not completely consumed in the fuel consumption place 180 are considered. According to the present embodiment, since the re-liquefaction amount may be increased by using the extra compressor 122, the capacity required for re-liquefaction may be reduced, and thus small-capacity compressors 120 and 122 can be provided. Reducing the capacity of the compressor can save both equipment installation costs and operating costs.

In the present embodiment, at ordinary times when the compressor 120 or the cooler 130 does not fail, not only the first valve 191 and the second valve 192 but also the third valve 193 and the fourth valve 194 are open so that all of the compressor 120, the cooler 130, the extra compressor 122, and the extra cooler 132 are operated, and when the compressor 120 or the cooler 130 fails, increasing the re-liquefaction efficiency and the re-liquefaction amount is abandoned and the first valve 191 and the second valve 192 are closed so that the system is operated only by the boil-off gas passing through the extra compressor 122 and the extra compressor 132.

For convenience of explanation, it is described that the compressor 120 and the cooler 130 play a major role and the extra compressor 122 and the extra cooler 132 play an auxiliary role. However, the compressor 120 and the extra compressor 122 and the cooler 130 and the extra cooler 132 play the same role. At least two compressors and coolers which play the same role are installed in one ship, and therefore when any one of the compressors and coolers fail, the other unbroken compressor and cooler may be used, which may satisfy a redundancy concept. Next, the above description is applied.

Therefore, as in the case in which the compressor 120 or the cooler 130 fails, even in the case in which the extra compressor 122 or the extra cooler 132 fails, increasing the re-liquefaction efficiency and the re-liquefaction amount is abandoned, and the third valve 193 and the fourth valve 194 are closed so that the system is operated only the boil-off gas passing through the compressor 120 and the cooler 130.

On the other hand, when the ship is operated at a high speed enough that most or all of the boil-off gas discharged from the storage tank T can be used as fuel for the fuel consumption place 180, there is little or no amount of boil-off gas. Accordingly, when the ship is operated at a high speed, only one of the compressor 120 and the first extra compressor 122 may be operated.

The compressor 120 and the extra compressor 122 may compress the boil-off gas to a pressure required by the fuel consumption place 180. The fuel consumption place 180 may be an engine, a generator, or the like which are operated by the boil-off gas as fuel. For example, if the fuel consumption place 180 is a boost engine for a ship, the compressor 120 and the extra compressor 122 may compress the boil-off gas to a pressure of approximately 10 to 100 bars.

In addition, the compressor 120 and the extra compressor 122 may also compress the boil-off gas to a pressure of approximately 150 bars to 400 bars when the fuel consumption place 180 is an ME-GI engine, and when the fuel consumption place 180 is a DFDE, the boil-off gas may be compressed to a pressure of approximately 6.5 bars, and when the fuel consumption place 180 is an X-DF engine, the boil-off gas may be compressed to a pressure of approximately 16 bars.

The fuel consumption place 180 may also include various kinds of engines. For example, when the fuel consumption place 180 includes the X-DF engine and the DFDE, the compressor 120 and the extra compressor 122 may compress the boil-off gas to the pressure required by the X-DF engine, and the decompressing device is installed on the upstream of the DFDE to lower a part of the boil-off gas compressed at the pressure required by the X-DF engine to a pressure required by the DFDE and then supply the compressed boil-off gas to the DFDE.

In addition, in order to increase the re-liquefaction efficiency and the re-liquefaction amount in the boil-off gas heat exchanger 110 and the refrigerant heat exchanger 140, the compressor 120 or the extra compressor 122 compresses the boil-off gas so that the pressure of the boil-off gas exceeds the pressure required by the fuel consumption place 180, and the decompressing device is installed on the upstream of the fuel consumption place 180 to lower the pressure of the compressed boil-off gas to exceed the pressure required by the fuel consumption place 180 to the pressure required by the fuel consumption place 180 and then supply the compressed boil-off gas to the fuel consumption place 180.

Meanwhile, the compressor 120 and the extra compressor 122 may each be a multi-stage compressor. FIG. 4 illustrates that one compressor 120 or 122 compresses the boil-off gas to the pressure required by the fuel consumption place 180, but when the compressor 120 and the extra compressor 122 are a multi-stage compressor, a plurality of compression cylinders may compress the boil-off gas to the pressure required by the fuel consumption place 180 several times.

When the compressor 120 and the extra compressor 122 are a multi-stage compressor, the plurality of compression cylinders may be provided in the compressor 120 and the extra compressor 122 in series and the plurality of coolers may each be provide on the downstream of the plurality of compression cylinders.

The cooler 130 of the present embodiment is installed downstream of the compressor 120 to cool the boil-off gas which is compressed by the compressor 120 and has the increased pressure and temperature. The extra cooler 132 of the present embodiment is installed downstream of the extra compressor 122 to cool the boil-off gas which is compressed by the extra compressor 122 and has the increased pressure and temperature. The cooler 130 and the extra cooler 132 may cool the boil-off gas by exchanging heat with seawater, fresh water, or air introduced from the outside.

The refrigerant heat exchanger 140 of the present embodiment additionally cools the boil-off gas which is cooled by the boil-off gas heat exchanger 110 and then supplied to the refrigerant heat exchanger 140 along the return line L3. The refrigerant decompressing device 160 of the present embodiment expands the boil-off gas which passes through the refrigerant heat exchanger 140 and then sends the expanded boil-off gas back to the refrigerant heat exchanger 140.

That is, the refrigerant heat exchanger 140 expands the boil-off gas, which passes through the boil-off gas heat exchanger 110 and then supplied to the refrigerant heat exchanger 140 along the return line L3, performs heat exchange by the refrigerant to additionally cool the boil-off gas expanded by the refrigerant decompressing device 160.

The refrigerant decompressing device 160 of the present embodiment may be various means for lowering the pressure of the fluid, and the state of the fluid just before passing through the refrigerant decompressing device 160 and the state of the fluid just after passing through the refrigerant decompressing device 160 may be changed depending on the operation condition of the system. However, when the refrigerant decompressing device 160 is an expander, in order to prevent a physical damage of the refrigerant decompressing device 160, the fluid just before passing through the refrigerant decompressing device 160 and the fluid just after passing through the refrigerant decompressing device 160 is preferably maintained in a gas phase. Next, the above description is applied.

By means of the boil-off gas used as the refrigerant for the heat exchange in the refrigerant heat exchanger 140 after passing through the refrigerant decompressing device 160, after the boil-off gas compressed by the compressor 120 is joined with the boil-off gas compressed by the extra compressor 122, a part of the joined boil-off gas is supplied to the refrigerant heat exchanger 140 along the recirculation line L5 and cooled by exchanging heat with the boil-off gas, which passes through the refrigerant decompressing device 160, in the refrigerant heat exchanger 140 by the refrigerant and then supplied to the refrigerant decompressing device 160.

In addition, the boil-off gas supplied from the first supply line L1 to the refrigerant heat exchanger 140 along the first supply line L1 is primarily used in the refrigerant heat exchanger 140 and is additionally cooled by the refrigerant decompressing device 160 and is then sent back to the refrigerant heat exchanger 140, such that the boil-off gas is used as the refrigerant.

That is, the flow of the boil-off gas compressed by the compressor 120 supplied to the refrigerant heat exchanger 140 along the recirculation line L5 after being joined with the boil-off gas compressed by the extra compressor 122 and the boil-off gas which passes through the boil-off gas heat exchanger 110 and is then supplied to the refrigerant heat exchanger 140 along the return line L3 exchange heat with each other by means of the boil-off gas, which passes through the refrigerant decompressing device 160, as a refrigerant to be cooled.

The first decompressing device 150 of the present embodiment is installed on the return line L3 to expand the boil-off gas cooled by the boil-off gas heat exchanger 110 and the refrigerant heat exchanger 140. The boil-off gas compressed by the compressor 120 is joined with the boil-off gas compressed by the extra compressor 122 and then a part of the boil-off gas is branched into pass through the boil-off gas heat exchanger 110, the refrigerant heat exchanger 140, and the first decompressing device 150, such that the boil-off gas is partially or totally re-liquefied.

The first decompressing device 150 includes all means which may expand and cool the boil-off gas, and may be an expansion valve, such as a Joule-Thomson valve, or an expander.

The ship of the present embodiment may include the gas-liquid separator 170 which is installed on the return line L3 on the downstream of the first decompressing device 150 and separates the gas-liquid mixture discharged from the first decompressing device 150 into gas and liquid.

When the ship of the present embodiment does not include the gas-liquid separator 170, the liquid or the boil-off gas in the gas-liquid mixed state which passes through the first decompressing device 150 is immediately sent to the storage tank T.

When the ship of the present embodiment includes the gas-liquid separator 170, the boil-off gas which passes through the first decompressing device 150 is sent to the gas-liquid separator 170 to separate the gas phase and the liquid phase. The liquid separated by the gas-liquid separator 170 returns to the storage tank T along the return line L3 and the gas separated by the gas-liquid separator 170 is supplied to the boil-off gas heat exchanger 110 along a gas discharge line which extends from the gas-liquid separator 170 to the first supply line L1 on the upstream of the boil-off gas heat exchanger 110.

When the ship of the present embodiment includes the gas-liquid separator 170, the ship may further include a seventh valve 197 which controls the flow rate of the liquid separated by the gas-liquid separator 170 and sent to the storage tank T; an eighth valve 198 which controls the flow rate of gas separated by the gas-liquid separator 170 and sent to the boil-off gas heat exchanger 110.

The first to eighth valves and the eleventh valve 191, 192, 193, 194, 195, 196, 197, 198, and 203 of the present embodiment may be manually controlled by allowing a person to directly determine the operation condition of the system and may be automatically controlled to be opened or closed depending on a preset value.

The main flow of the boil-off gas is defined to easily describe the operation of the device for re-liquefaction of boil-off gas according to an embodiment of the present invention. A flow in which the boil-off gas generated from the storage tank T and the gas discharged from the gas-liquid separator 170 is supplied to the boil-off gas heat exchanger 110 is defined as a first flow 100, a flow which is supplied from the boil-off gas heat exchanger 110 to the compressor 120 and the extra compressor 122 and then discharged from the compressor 120 or the extra compressor 122 and supplied to the fuel consumption place 180 is defined as a second flow 102, a flow which is branched from the second flow 102 on the downstream of the compressor 120 and the extra compressor 122 and the supplied to the refrigerant heat exchanger 140 is defined as a third flow 104, a flow which is branched from the second flow 102 on the downstream of the compressor 120 and the extra compressor 122 and supplied to the boil-off gas heat exchanger 110 is defined as a fourth flow 106, and a flow which is supplied from the boil-off gas heat exchanger 110 to the refrigerant heat exchanger 140 is defined as a fifth flow 108. The first flow 100 becomes the second flow while passing through the boil-off heat exchanger 110 and the fourth flow 106 becomes the fifth flow 108 while passing through the boil-off heat exchanger 110.

Hereinafter, an operation of an apparatus for re-liquefaction of boil-off gas re-according to an embodiment of the present invention will be described with reference to FIG. 4. (Temperature and pressure when the natural gas is suitable it is suitable for the X-DF, and in the case of the X-DF and the natural gas, and temperature and pressure at important point in the case (ME-GI+natural gas), (DF+natural gas), (X-DF+ethane))

The gaseous boil-off gas generated from the storage tank (T) storing the liquefied gas in the liquid phase is supplied to the boil-off gas heat exchanger (110). At this time, the gaseous boil-off gas generated from the storage tank T meets the gaseous boil-off gas discharged from the gas-liquid separator 170 after the predetermined time elapses from the operation of the system to form the first flow 100. Ultimately, the boil-off gas supplied to the boil-off gas heat exchanger 110 becomes the first flow 100.

The boil-off gas heat exchanger 110 serves to recover the cold heat of the first flow 100 to cool the other boil-off gas. That is, the boil-off heat exchanger 110 recovers the cold heat of the first flow 100 and delivers the recovered cold heat to the flow supplied back to the boil-off heat exchanger 110 in the second flow 102, that is, the fourth flow 106.

Accordingly, in the boil-off heat exchanger 110, the heat exchange is generated between the first flow 100 and the fourth flow 106 so that the first flow 100 is heated and the fourth flow 106 is cooled. The heated first flow 100 becomes the second flow 102 and the cooled fourth flow 106 becomes the fifth flow 108.

The second flow 102 discharged from the boil-off gas heat exchanger 110 is supplied to the compressor 120 or the extra compressor 122 and is compressed by the compressor 120 or the extra compressor 122.

A part of the second flow 102 in which the boil-off gas compressed by the compressor 120 and the boil-off gas compressed by the extra compressor 122 are joined is the third flow 104 and supplied to the refrigerant heat exchanger 140 as a refrigerant, and the other part thereof is the fourth flow 106 and is supplied to the boil-off gas heat exchanger 110 to be cooled and the remaining part thereof is supplied to the fuel consumption place 180.

The third flow 104 supplied to the refrigerant heat exchanger 140 is discharged from the refrigerant heat exchanger 140 and expanded in the refrigerant decompressing device 160 and then supplied back to the refrigerant heat exchanger 140. At this time, the third flow 104 primarily supplied to the refrigerant heat exchanger 140 is expanded in the refrigerant heat exchanger 140 and then exchanges heat with the third flow 104 supplied back to the refrigerant heat exchanger 140 to be cooled. The third flow 104 which passes through the refrigerant decompressing device 160 and the refrigerant heat exchanger 140 is joined with the second flow 102 that is discharged from the boil-off gas heat exchanger 110 and supplied to the compressor 120 or the extra compressor 122.

The fourth flow 106 cooled by the heat exchange with the first flow 100 in the boil-off gas heat exchanger 110 becomes the fifth flow 108 and is supplied to the refrigerant heat exchanger 140. The fifth flow 108 supplied to the refrigerant heat exchanger 140 exchanges heat with the third flow 104 which passes through the refrigerant decompressing device 160 and is cooled, and then passes through the first decompressing device 150 and expanded. The fifth flow 108 which passes through the first decompressing device 150 becomes a gas-liquid mixture state in which gas and liquid are mixed.

The fifth flow 108 in the gas-liquid mixture state is immediately sent to the storage tank T or separated into gas and liquid while passing through the gas-liquid separator 170. The liquid separated by the gas-liquid separator 170 is supplied to the storage tank T and the gas separated by the gas-liquid separator 170 is supplied back to the boil-off gas heat exchanger 110, thereby repeating the above-mentioned series of processes.

FIG. 5 is a configuration diagram schematically showing a boil-off gas treatment system for a ship according to a fourth embodiment of the present invention.

The ship of the fourth embodiment shown in FIG. 5 further includes a ninth valve 201, a tenth valve 202, and a first additional line L6 as compared with the ship of the third embodiment shown in FIG. 4. The ship of the fourth embodiment is different from that of the third embodiment in that the ship is configured to operate the refrigerant cycle as the closed loop as in the first and second embodiments and operate the refrigerant cycle as the open loop as in the third embodiment, by modifying some lines along which the boil-off gas flows. Hereinafter, the difference will be mostly described. The detailed description of the same member as the ship of the foregoing third embodiment will be omitted.

Referring to FIG. 5, similar to the third embodiment, the ship of the present embodiment includes the boil-off gas heat exchanger 110, the first valve 191, the compressor 120, the cooler 130, the second valve 192, the third valve 193, the extra compressor 122, the extra cooler 132, the fourth valve 194, the refrigerant heat exchanger 140, the refrigerant decompressing device 160, and the first decompressing device 150.

Similar to the third embodiment, the storage tank T stores liquefied gas such as liquefied natural gas and liquefied ethane gas, and discharges the boil-off gas to the outside when the internal pressure of the storage tank T exceeds a certain pressure or higher. The boil-off gas discharged from the storage tank (T) is sent to the boil-off gas heat exchanger 110.

Similar to the third embodiment, the boil-off gas heat exchanger 110 of the present embodiment uses the boil-off gas discharged from the storage tank T as the refrigerant and cools the boil-off gas supplied to the boil-off gas heat exchanger 110 along the return line L3. That is, the boil-off gas heat exchanger 110 recovers the cold heat of the boil-off gas discharged from the storage tank T and supplies the recovered cold heat to the boil-off gas sent to the boil-off gas heat exchanger 110 along the return line L3. The fifth valve 195 which controls the flow rate of the boil-off gas and opening/closing thereof may be installed on a return line L3.

Similar to the third embodiment, the compressor 120 of the present embodiment is installed on the first supply line L1 to compress the boil-off gas discharged from the storage tank T and similar to the third embodiment, the extra compressor 122 of the present embodiment is installed in parallel with the compressor 120 on the second supply line L2 to compress the boil-off gas discharged from the storage tank T. The compressor 120 and the extra compressor 122 may be a compressor having the same performance, and each may be a multi-stage compressor.

Similar to the third embodiment, the compressor 120 and the extra compressor 122 of the present embodiment may compress the boil-off gas to the pressure required by the fuel consumption place 180. In addition, when the fuel consumption place 180 includes various kinds of engines, after the boil-off gas is compressed according to the required pressure of the engine requiring a higher pressure (hereinafter referred to as a 'high pressure engine'), a part of the boil-off gas is supplied to the high pressure engine and the other part thereof is supplied to the engine (hereinafter, referred to as 'low pressure engine') requiring a lower pressure. The boil-off gas may be decompressed by the decompressing device installed on the upstream and supplied to the low pressure engine. In addition, in order to increase the re-liquefaction efficiency and the re-liquefaction amount in the boil-off gas heat exchanger 110 and the refrigerant heat exchanger 140, the compressor 120 or the extra compressor 122 compresses the boil-off gas to a pressure equal to or higher than the pressure required by the fuel consumption place 180, and the decompressing device is installed on the fuel consumption place 180 to lower the pressure of the boil-off gas compressed at the high pressure to the pressure required by the fuel consumption place 180 and then supply the decompressed boil-off gas to the fuel consumption place 180.

Similar to the third embodiment, the ship of the present embodiment may further include an eleventh valve 203 which is installed upstream of the fuel consumption place 180 to control a flow rate of the boil-off gas sent to the fuel consumption place 180 and opening/closing thereof.

Similar to the third embodiment, the ship of the present embodiment uses the boil-off gas compressed by the extra compressor 122 as the refrigerant which additionally cools the boil-off gas in the refrigerant heat exchanger 140, thereby increasing the re-liquefaction efficiency and the re-liquefaction amount.

Similar to the third embodiment, the cooler 130 of the present embodiment is installed downstream of the compressor 120 to cool the boil-off gas that passes through the compressor 120 and has the increased pressure and temperature. Similar to the third embodiment, the extra cooler 132 of the present embodiment is installed downstream of the extra compressor 122 to cool the boil-off gas which passes through the extra compressor 122 and has the increased pressure and temperature.

Similar to the third embodiment, the refrigerant heat exchanger 140 of the present embodiment additionally cools the boil-off gas which is supplied to the boil-off gas heat exchanger 110 along the return line L3 and cooled by the boil-off gas heat exchanger 110.

Similar to the third embodiment, according to the present embodiment, the boil-off gas discharged from the storage tank T is further cooled not only in the boil-off gas heat exchanger 110 but also in the refrigerant heat exchanger 140, and may be supplied to the first decompressing device 150 in the state in which the temperature is lower, thereby increasing the re-liquefaction efficiency and the re-liquefaction amount.

Similar to the third embodiment, the refrigerant decompressing device 160 of the present embodiment expands the boil-off gas which passes through the refrigerant heat exchanger 140, and then sends the expanded boil-off gas back to the refrigerant heat exchanger 140.

Similar to the third embodiment, the first decompressing device 150 of the present embodiment is installed on the return line L3 to expand the boil-off gas cooled by the boil-off gas heat exchanger 110 and the refrigerant heat exchanger 140. The first decompressing device 150 of the present embodiment includes all means which may expand and cool the boil-off gas, and may be an expansion valve, such as a Joule-Thomson valve, or an expander.

Similar to the third embodiment, the ship of the present embodiment may include the gas-liquid separator 170 which is installed on the return line L3 on the downstream of the first decompressing device 150 and separates the gas-liquid mixture discharged from the first decompressing device 150 into gas and liquid.

Similar to the third embodiment, when the ship of the present embodiment does not include the gas-liquid separator 170, the liquid or the boil-off gas in the gas-liquid mixed state which passes through the first decompressing device 150 is directly sent to the storage tank T, and when the ship of the present embodiment includes the gas-liquid separator 170, the boil-off gas which passes through the first decompressing device 150 is sent to the gas-liquid separator 170 to be separated into the gas phase and the liquid phase. The liquid separated by the gas-liquid separator 170 returns to the storage tank T along the return line L3 and the gas separated by the gas-liquid separator 170 is supplied to the boil-off gas heat exchanger 110 along a gas discharge line which extends from the gas-liquid separator 170 to the first supply line L1 on the upstream of the boil-off gas heat exchanger 110.

Similar to the third embodiment, when the ship of the present embodiment includes the gas-liquid separator 170, the ship may further include a seventh valve 197 which controls the flow rate of the liquid separated by the gas-liquid separator 170 and sent to the storage tank T; an eighth valve 198 which controls the flow rate of gas separated by the gas-liquid separator 170 and sent to the boil-off gas heat exchanger 110.

However, unlike the third embodiment, the ship of the present embodiment has a first additional line L6 connecting between the recirculation line L5 and the second supply line L2; a ninth valve 201 installed on the recirculation line L5; and a tenth valve 202 installed on the first additional line L6. Unlike the third embodiment which selectively includes the sixth valve, the ship of the present embodiment essentially includes the sixth valve 196 which is installed on the recirculation line L5 along which the boil-off gas branched from the first supply line L1 is sent to the refrigerant heat exchanger 140 to control the flow rate of the boil-off gas and the opening/closing thereof.

One side of the first additional line L6 of the present embodiment is connected to a recirculation line (not shown) which is expanded by the refrigerant decompressing device 160 and then sent to the first supply line L1 through the refrigerant heat exchanger 140 L5 and the other side thereof is connected to the second supply line L2 between the third valve 193 and the extra compressor 122.

The ninth valve 201 of the present embodiment is installed on the recirculation line L5 between the point where the recirculation line L5 meets the first supply line L1 on the upstream of the compressor 120 and the extra compressor 122 and the point where the recirculation line L5 meets the first additional line L6.

In addition, the ship of the present embodiment is different from the third embodiment in that the second supply line L2 on the downstream of the extra compressor 122 is connected to the recirculation line L5 instead of the first supply line L1.

The first to eighth valves and the eleventh valve 191, 192, 193, 194, 195, 196, 197, 198, 201, 202 and 203 of the present embodiment may be manually controlled by allowing a person to directly determine the operation condition of the system and may be automatically controlled to be opened or closed depending on a preset value.

The differentiated features of the ship of the present embodiment from of the ship of the third embodiment are that the refrigerant cycle may be operated not only as the open loop but also as the closed loop so as to more flexibly use the re-liquefaction system according to the operating conditions of the ship. Hereinafter, a method of operating a refrigerant cycle as the closed loop and a method of operating a refrigerant cycle as the open loop by a valve control will be described.

To operate the refrigerant cycle of the ship of the present embodiment as the closed loop, the system is operated while the first valve 191, the second valve 192, the third valve 193, the fourth valve 194, and the tenth valve 202 are open, and the sixth valve 196 and the ninth valve 201 is closed.

If the boil-off gas which is discharged from the storage tank T and then compressed by the extra compressor 122 is supplied to the recirculation line L5, the third valve 193 is closed to form the refrigerant cycle of the closed loop in which the boil-off gas circulates the extra compressor 122, the extra cooler 132, the fourth valve 194, the refrigerant heat exchanger 140, the refrigerant decompressing device 160, the refrigerant heat exchanger 140, and the tenth valve 202.

When the refrigerant cycle is configured as the closed loop, nitrogen gas may be used as the refrigerant circulating the closed loop. In this case, the storage tank of the present embodiment may further include a pipe through which nitrogen gas is introduced into the refrigerant cycle of the closed loop.

When the refrigerant cycle is operated as the closed loop, only the boil-off gas circulating the closed loop is used as the refrigerant in the refrigerant heat exchanger 140. The boil-off gas passing through the compressor 120 is not introduced into the refrigerant cycle but is supplied to the fuel consumption place 180 or undergoes the re-liquefaction process along the return line L3. Therefore, a predetermined flow rate of boil-off gas is circulated as the refrigerant in the refrigerant heat exchanger 140 irrespective of the re-liquefaction amount or the amount of boil-off gas required by the fuel consumption place 180.

The flow of the boil-off gas in the case where the refrigerant cycle of the ship of the present embodiment is operated as the closed loop will be described as follows.

The boil-off gas discharged from the storage tank T passes through the boil-off gas heat exchanger 110 and then compressed by the compressor 120, and a part thereof is cooled by the cooler 130 and then sent to the fuel consumption place 180, and the remaining part thereof is sent to the boil-off gas heat exchanger 110 along the return line L3. The boil-off gas sent to the boil-off gas heat exchanger 110 along the return line L3 exchanges heat with the boil-off gas discharged from the storage tank T to be cooled and is then heat-exchanged in the refrigerant heat exchanger 140 to be additionally cooled.

The boil-off gas cooled by the boil-off gas heat exchanger 110 and the refrigerant heat exchanger 140 is expanded by the first decompressing device 150 and thus the boil-off gas is partially or totally re-liquefied. When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is supplied to the storage tank T.

Meanwhile, the boil-off gas circulating the refrigerant cycle is compressed by the extra compressor 122, cooled by the extra cooler 132, and then sent to the refrigerant heat exchanger 140 along the recirculation line L5. The boil-off gas which passes through the extra compressor 122 and the extra cooler 132 and then sent to the refrigerant heat exchanger 140 is primarily heat-exchanged in the refrigerant heat exchanger 140 to be cooled and then sent to the refrigerant decompressing device 160 to be secondarily expanded and cooled. The boil-off gas which passes through the refrigerant decompressing device 160 is sent back to the refrigerant heat exchanger 140 to be used as a refrigerant which cools the boil-off gas passing through the boil-off gas heat exchanger 110 and then supplied to the refrigerant heat exchanger 140 along the return line L3 and the boil-off gas compressed by the extra compressor 122 and then supplied to the refrigerant heat exchanger 140 along the recirculation line L5. The boil-off gas which passes through the refrigerant decompressing device 160 and then used as the refrigerant in the refrigerant heat exchanger 140 is sent back to the extra compressor 122, thereby repeating the above-mentioned series of processes.

When the compressor 120 or the cooler 130 fails while the refrigerant cycle of the ship of the present embodiment is operated as the closed loop, the first valve 191, the second valve 192, and the tenth valve 202 are closed and the third valve 193 and the sixth valve 196 are open to allow the boil-off gas which is discharged from the storage tank T and then passes through the boil-off gas heat exchanger 110 to be supplied to the fuel consumption place 180 via the third valve 193, the extra compressor 122, the extra cooler 132, the fourth valve 194, and the sixth valve 196. When it is necessary to use the boil-off gas compressed by the extra compressor 122 as the refrigerant of the refrigerant heat exchanger 140, the ninth valve 201 may be open to operate the system.

To operate the refrigerant cycle of the ship of the present embodiment as the open loop, the first valve 191, the second valve 192, the third valve 193, the fourth valve 194, the sixth valve 196, and the ninth valve 201 are open, and the tenth valve 202 are closed.

When the refrigerant cycle is operated as the closed loop, the boil-off gas circulating the refrigerant cycle and the boil-off gas sent to the fuel consumption place 180 or undergoing the re-liquefaction process along the return line L3 are separated. On the other hand, when the refrigerant cycle is operated as the open loop, the boil-off gas compressed by the compressor 120 and the boil-off gas compressed by the extra compressor 122 are joined to be used as a refrigerant in the refrigerant heat exchanger 140, to be sent to the high pressure engine 180, or to undergo the re-liquefying process along the return line L3.

Therefore, if the refrigerant cycle is operated as the open loop, the flow rate of the refrigerant to be sent to the refrigerant heat exchanger 140 may be flexibly controlled in consideration of the re-liquefaction amount and the amount of boil-off gas required by the fuel consumption place 180. In particular, when the amount of boil-off gas required by the fuel consumption place 180 is small, increasing the flow rate of the refrigerant sent to the refrigerant heat exchanger 140 may increase the re-liquefaction efficiency and the re-liquefaction amount.

That is, when the refrigerant cycle is operated as the closed loop, it is not possible to supply the refrigerant heat exchanger 140 with the boil-off gas equal to or more than the capacity of the extra compressor 122. However, when the refrigerant cycle is operated as the open loop, the boil-off gas having a flow rate exceeding the capacity of the extra compressor 122 may be supplied to the refrigerant heat exchanger 140.

The flow of the boil-off gas in the case where the refrigerant cycle of the ship of the present embodiment is operated as the open loop will be described as follows.

The boil-off gas discharged from the storage tank T is branched into two flows after passing through the boil-off gas heat exchanger 110 and a part thereof is sent to the first supply line L1 and the remaining part thereof is supplied to the second supply line L2.

The boil-off gas sent to the first supply line L1 passes through the first valve 191, the compressor 120, the cooler 130, and the second valve 192 and then a part thereof passes through the sixth valve 196 and is sent to the refrigerant heat exchanger 140, and the other part thereof is again branched into two flows. One flow of the boil-off gases branched into the two flows is sent to the fuel consumption place 180 and the other thereof is sent to the boil-off gas heat exchanger 110 along the return line L3.

The boil-off gas sent to the second supply line L1 passes through the third valve 193, the extra compressor 122, the extra cooler 132, and the fourth valve 194 and then a part thereof is sent to the refrigerant heat exchanger 140 and the other part thereof is sent to the first supply line L1 and then branched into two flows. One flow of the boil-off gases branched into the two flows is sent to the fuel consumption place 180 and the other thereof is sent to the boil-off gas heat exchanger 110 along the return line L3.

For convenience of explanation, the boil-off gas compressed by the compressor 120 and the boil-off gas compressed by the extra compressor 122 are separately described. However, each of the boil-off gas compressed by the compressor 120 and the boil-off gas compressed by the extra compressor 122 does not flow separately but is joined to be supplied to the refrigerant heat exchanger 140, the fuel consumption place 180, or the boil-off gas heat exchanger 110. That is, the boil-off gas compressed by the compressor 120 and the boil-off gas compressed by the extra compressor 122 are mixed, which in turn flows in the recirculation line L5 along which the boil-off gas is sent to the refrigerant heat exchanger 140, the first supply line L1 along which the boil-off gas is sent to the fuel consumption place 180, and the return line along which the boil-off gas is sent to the boil-off gas heat exchanger 110.

The boil-off gas sent to the refrigerant heat exchanger 140 along the recirculation line L5 is primarily heat-exchanged in the refrigerant heat exchanger 140 to be cooled, and secondarily expanded by the refrigerant decompressing device 160 to be cooled and supplied back to the refrigerant heat exchanger 140. The boil-off gas which passes through the refrigerant decompressing device 160 and is then supplied to the refrigerant heat exchanger 140 is used as the refrigerant which cools both of the boil-off gas passing through the boil-off gas heat exchanger 110 and then supplied to the refrigerant heat exchanger 140 along the return line L3 and the confluent flow of the boil-off gas compressed by the compressor 120 and the boil-off gas compressed by the extra compressor 122 which are supplied to the refrigerant heat exchanger 140 along the recirculation line L5.

That is, the boil-off gas used as the refrigerant in the refrigerant heat exchanger 140 is supplied to the refrigerant heat exchanger 140 along the recirculation line L5, and then primarily cooled by the refrigerant heat exchanger 140 and secondarily cooled by the refrigerant decompressing device 160. In addition, the boil-off gas sent from the compressor 120 or the extra compressor 122 to the refrigerant heat exchanger 140 along the recirculation line L5 is primarily cooled by means of the boil-off gas, which passes through the refrigerant decompressing device 160, as the refrigerant.

The boil-off gas used as the refrigerant in the refrigerant heat exchanger 140 after passing through the refrigerant decompressing device 160 is sent to the first supply line L1 through the ninth valve 201 to be discharged from the storage tank T and then joins with the boil-off gas passing through the boil-off gas heat exchanger 110, thereby repeating the above-mentioned series of processes.

The boil-off gas sent to the boil-off gas heat exchanger 110 along the return line L3 is primarily cooled by the boil-off gas heat exchanger 110, secondarily cooled by the refrigerant heat exchanger 140, and then expanded by the first decompressing device 150, such that the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is supplied to the storage tank T.

When the compressor 120 or the cooler 130 fails while the refrigerant cycle of the ship of the present embodiment is operated as the open loop, the first valve 191, the second valve 192, and the ninth valve 201 are closed to allow the boil-off gas which is discharged from the storage tank T and then passes through the boil-off gas heat exchanger 110 to be supplied to the fuel consumption place 180 via the third valve 193, the extra compressor 122, the extra cooler 132, the fourth valve 194, and the sixth valve 196. When it is necessary to use the boil-off gas compressed by the extra compressor 122 as the refrigerant of the refrigerant heat exchanger 140, the ninth valve 201 may be open to operate the system.

When the refrigerant cycle of the ship of the present embodiment is operated as the open loop, the liquefied gas stored in the storage tank T is liquefied natural gas, the fuel consumption place 180 is the X-DF engine, and the refrigerant cycle includes the gas-liquid separator 170, temperatures and pressures of fluid at each point will be described as an example.

Boil-off gas at point A where the boil-off gas discharged from the storage tank T and the boil-off gas separated by the gas-liquid separator 170 are joined and supplied to the boil-off gas heat exchanger 110 may be approximately −120° C. and 1.060 bara, and boil-off gas at point B after the boil-off gas of approximately −120° C. and 1.060 bara exchanges heat with the boil-off gas of 43° C. and 20 bara in the boil-off gas heat exchanger 110 may be approximately 3° C. and 0.96 bara.

In addition, it may be assumed that the boil-off gas of approximately 3° C. and 0.96 bara passes through the refrigerant decompressing device 160 and then joined with the boil-off gas of approximately 20° C. and 0.96 bara passing through the refrigerant heat exchanger 140 and then the boil-off gas at point C may be approximately 15° C. and 0.96 bara.

The boil-off gas of approximately 15° C. and 0.96 bara is branched into two, and one flow is compressed by the compressor 120 and then cooled by the cooler 130, the other flow is compressed by the extra compressor 122 and is then cooled by the extra cooler 132. The boil-off gas at the point D and the boil-off gas at the point H which are the confluent flow of the flow passing through the compressor 120 and the cooler 130 and the flow passing through the extra compressor 122 and the extra cooler 132 may be approximately 43° C. and 20 bara.

Boil-off gas at point E after the boil-off gas of approximately 43° C. and 20 bara exchanges heat with the boil-off gas of approximately −120° C. and 1.060 bara in the boil-off gas heat exchanger 110 may be approximately −110° C. and 20 bara, boil-off gas at point F after the boil-off gas of approximately −110° C. and 20 bara is cooled by the refrigerant heat exchanger 140 may be approximately −153° C. and 20 bara, and boil-off gas at point G after the boil-off gas of approximately −153° C. and 20 bara is expanded by the first decompressing device 150 may be −157° C. and 2.1 bara.

On the other hand, the boil-off gas at point I after the boil-off gas of approximately 43° C. and 20 bara is primarily cooled by the refrigerant heat exchanger 140 may be approximately −73° C. and 20 bara, the boil-off gas at point J after the boil-off gas of approximately −73° C. and 20 bara is secondarily cooled by the refrigerant decompressing device 160 may be approximately −154° C. and 1.56 bara, and the boil-off gas at point K after the boil-off gas of approximately −154° C. and 1.56 bara is used in the refrigerant heat exchanger 140 may be approximately 20° C. and 0.96 bara.

The ship of the present embodiment may be independently operated while operating the refrigerant cycle as the open loop so that the boil-off gas compressed by the extra compressor 122 is used only as the refrigerant of the refrigerant heat exchanger 140, the boil-off gas compressed by the compressor 120 is sent to the fuel consumption place 180 or undergoes the re-liquefaction process along the return line L3 and is not used as the refrigerant of the refrigerant heat exchanger 140. Hereinafter, the refrigerant cycle of the open loop in which the extra compressor 122 and the compressor 120 are operated independently is referred to as an 'independent open loop'.

To operate the refrigerant cycle of the ship of the present embodiment as the independent open loop, the first valve 191, the second valve 192, the third valve 193, the fourth valve 194, and the ninth valve 201 are open, and the sixth valve 196 and the tenth valve 202 are closed. When the refrigerant cycle is operated as the independent open loop, the system can be operated more easily than when the open loop is operated.

The flow of the boil-off gas in the case where the refrigerant cycle of the ship of the present embodiment is operated as the independent open loop will be described as follows.

The boil-off gas discharged from the storage tank T is branched into two flows after passing through the boil-off gas heat exchanger 110 and a part thereof is sent to the first supply line L1 and the remaining part thereof is supplied to the second supply line L2. The boil-off gas sent to the first supply line L1 passes through the first valve 191, the compressor 120, the cooler 130, and the second valve 192 and then a part thereof is sent to the fuel consumption place 180 and the other part thereof is sent to the boil-off gas heat exchanger 110 along the return line L3. The boil-off gas sent to the second supply line L2 passes through the third valve 193, the extra compressor 122, the extra cooler 132, and the fourth valve 194 and is then sent to the refrigerant heat exchanger 140 along the recirculation line L5.

The boil-off gas which is compressed by the extra compressor 122 and then sent to the refrigerant heat exchanger 140 along the recirculation line L5 is used as the refrigerant which cools the boil-off gas which is primarily heat-exchanged in the refrigerant heat exchanger 140 to be cooled, secondarily expanded by the refrigerant decompressing device 160 to be cooled, and then supplied back to the refrigerant heat exchanger 140 to pass through the boil-off gas heat exchanger 110 and then be supplied to the refrigerant heat exchanger 140 via the return line L3 and the boil-off gas which is compressed by the extra compressor 122 and then supplied to the refrigerant heat exchanger 140 along the recirculation line L5.

The boil-off gas used as the refrigerant in the refrigerant heat exchanger 140 after passing through the refrigerant decompressing device 160 is sent to the first supply line L1 through the ninth valve 201 to be discharged from the storage tank T and then joins with the boil-off gas passing through the boil-off gas heat exchanger 110, thereby repeating the above-mentioned series of processes.

The boil-off gas compressed by the compressor 120 and then sent to the boil-off gas heat exchanger 110 along the return line L3 is primarily cooled by the boil-off gas heat exchanger 110, secondarily cooled by the refrigerant heat exchanger 140, and then expanded by the first decompressing device 150, such that the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is supplied to the storage tank T.

When the compressor 120 or the cooler 130 fails while the refrigerant cycle of the ship of the present embodiment is operated as the independent closed loop, the first valve 191, the second valve 192, and the ninth valve 201 are closed and the sixth valve 196 is open to allow the boil-off gas which is discharged from the storage tank T and then passes through the boil-off gas heat exchanger 110 to be supplied to the fuel consumption place 180 via the third valve 193, the extra compressor 122, the extra cooler 132, the fourth valve 194, and the sixth valve 196. When it is necessary to use the boil-off gas compressed by the extra compressor 122 as the refrigerant of the refrigerant heat exchanger 140, the ninth valve 201 may be open to operate the system.

FIG. 6 is a configuration diagram schematically showing a boil-off gas treatment system for a ship according to a fifth embodiment of the present invention.

The ship of the fifth embodiment shown in FIG. 6 is different from the ship of the fourth embodiment shown in FIG. 5 in that a twelfth valve 301, a thirteenth valve 302, a fourteenth valve 303, a fifteenth valve 304, a second additional line L7, a third additional line L8, a fourth additional line L9, and a fifth additional line L10 are further provided. Hereinafter, the difference will be mainly described. The detailed description of the same member as the ship of the foregoing fourth embodiment will be omitted.

Referring to FIG. 6, similar to the fourth embodiment, the ship of the present embodiment includes the boil-off gas heat exchanger 110, the first valve 191, the compressor 120, the cooler 130, the second valve 192, the third valve 193, the extra compressor 122, the extra cooler 132, the fourth valve 194, the refrigerant heat exchanger 140, the refrigerant decompressing device 160, and the first decompressing device 150.

Similar to the fourth embodiment, the storage tank T stores liquefied gas such as liquefied natural gas and liquefied ethane gas, and discharges the boil-off gas to the outside when the internal pressure of the storage tank T exceeds a certain pressure or higher. The boil-off gas discharged from the storage tank (T) is sent to the boil-off gas heat exchanger 110.

Similar to the fourth embodiment, the boil-off gas heat exchanger 110 of the present embodiment uses the boil-off gas discharged from the storage tank T as the refrigerant and cools the boil-off gas supplied to the boil-off gas heat exchanger 110 along the return line L3.

Similar to the fourth embodiment, the compressor 120 of the present embodiment is installed on the first supply line L1 to compress the boil-off gas discharged from the storage tank T and similar to the fourth embodiment, the extra compressor 122 of the present embodiment is installed in parallel with the compressor 120 on the second supply line L2 to compress the boil-off gas discharged from the storage tank T. The compressor 120 and the extra compressor 122 may be a compressor having the same performance, and each may be a multi-stage compressor.

Similar to the fourth embodiment, the compressor 120 and the extra compressor 122 of the present embodiment may compress the boil-off gas to the pressure required by the fuel consumption place 180. In addition, when the fuel consumption place 180 includes various kinds of engines, after the boil-off gas is compressed according to the required pressure of the high pressure engine, a part of the compressed gas may be supplied to the high pressure engine and the other part thereof may be decompressed by the decompressing device installed on the upstream of the low pressure engine and then supplied to the low pressure engine. In addition, in order to increase the re-liquefaction efficiency and the re-liquefaction amount in the boil-off gas heat exchanger 110 and the refrigerant heat exchanger 140, the compressor 120 or the extra compressor 122 compresses the boil-off gas to a pressure equal to or higher than the pressure required by the fuel consumption place 180, and the decompressing device is installed on the fuel consumption place 180 to lower the pressure of the boil-off gas compressed at the high pressure to the pressure required by the fuel consumption place 180 and then supply the decompressed boil-off gas to the fuel consumption place 180.

Similar to the fourth embodiment, the ship of the present embodiment may further include an eleventh valve 203 which is installed upstream of the fuel consumption place 180 to control a flow rate of the boil-off gas sent to the fuel consumption place 180 and opening/closing thereof.

Similar to the fourth embodiment, the ship of the present embodiment uses the boil-off gas compressed by the extra compressor 122 as the refrigerant which additionally cools the boil-off gas in the refrigerant heat exchanger 140, thereby increasing the re-liquefaction efficiency and the re-liquefaction amount.

Similar to the fourth embodiment, the cooler 130 of the present embodiment is installed downstream of the compressor 120 to cool the boil-off gas that passes through the compressor 120 and has the increased pressure and temperature. Similar to the fourth embodiment, the extra cooler 132 of the present embodiment is installed downstream of the extra compressor 122 to cool the boil-off gas which passes through the extra compressor 122 and has the increased pressure and temperature.

Similar to the fourth embodiment, the refrigerant heat exchanger 140 of the present embodiment additionally cools the boil-off gas which is supplied to the boil-off gas heat exchanger 110 along the return line L3 and cooled by the boil-off gas heat exchanger 110.

Similar to the fourth embodiment, according to the present embodiment, the boil-off gas discharged from the storage tank T is further cooled not only in the boil-off gas heat exchanger 110 but also in the refrigerant heat exchanger 140, and may be supplied to the first decompressing device 150 in the state in which the temperature is lower, thereby increasing the re-liquefaction efficiency and the re-liquefaction amount.

Similar to the fourth embodiment, the refrigerant decompressing device 160 of the present embodiment expands the boil-off gas which passes through the refrigerant heat exchanger 140, and then sends the expanded boil-off gas back to the refrigerant heat exchanger 140.

Similar to the fourth embodiment, the first decompressing device 150 of the present embodiment is installed on the return line L3 to expand the boil-off gas cooled by the boil-off gas heat exchanger 110 and the refrigerant heat exchanger 140. The first decompressing device 150 of the present embodiment includes all means which may expand and cool the boil-off gas, and may be an expansion valve, such as a Joule-Thomson valve, or an expander.

Similar to the fourth embodiment, the ship of the present embodiment may include the gas-liquid separator 170 which is installed on the return line L3 on the downstream of the first decompressing device 150 and separates the gas-liquid mixture discharged from the first decompressing device 150 into gas and liquid.

Similar to the fourth embodiment, when the ship of the present embodiment does not include the gas-liquid separator 170, the liquid or the boil-off gas in the gas-liquid mixed state which passes through the first decompressing device 150 is directly sent to the storage tank T, and when the ship of the present embodiment includes the gas-liquid separator 170, the boil-off gas which passes through the first decompressing device 150 is sent to the gas-liquid separator 170 to be separated into the gas phase and the liquid phase. The liquid separated by the gas-liquid separator 170 returns to the storage tank T along the return line L3 and the gas separated by the gas-liquid separator 170 is supplied to the boil-off gas heat exchanger 110 along a gas discharge line which extends from the gas-liquid separator 170 to the first supply line L1 on the upstream of the boil-off gas heat exchanger 110.

Similar to the fourth embodiment, when the ship of the present embodiment includes the gas-liquid separator 170, the ship may further include a seventh valve 197 which controls the flow rate of the liquid separated by the gas-liquid separator 170 and sent to the storage tank T; an eighth valve 198 which controls the flow rate of gas separated by the gas-liquid separator 170 and sent to the boil-off gas heat exchanger 110.

Similar to the fourth embodiment, the ship of the present embodiment further includes the sixth valve 196 which is installed on the recirculation line L5, the first additional line L6 which connects the recirculation line L5 and the second supply line L2, the ninth valve 201 which is installed on the recirculation line L5, and the tenth valve 202 which is installed on the first additional line L6.

Similar to the fourth embodiment, one side of the first additional line L6 of the present embodiment is connected to a recirculation line (not shown) which is expanded by the refrigerant decompressing device 160 and then sent to the first supply line L1 through the refrigerant heat exchanger 140 L5 and the other side thereof is connected to the second supply line L2 between the third valve 193 and the extra compressor 122.

Similar to the fourth embodiment, the ninth valve 201 of the present embodiment is installed on the recirculation line L5 between the point where the recirculation line L5 meets the first supply line L1 on the upstream of the compressor 120 and the extra compressor 122 and the point where the recirculation line L5 meets the first additional line L6.

However, the ship of the present embodiment is different from the third embodiment in that the second supply line L2 on the downstream of the extra compressor 122 is connected to the first supply line L1 and the recirculation line L5 on the upstream of the refrigerant heat exchanger 140 is connected to the second supply line L1.

In addition, unlike the fourth embodiment, the ship of the present embodiment has a first additional line L6 on the upstream of the tenth valve 202, a second additional line L7 which connects between the first valve 191 and the compressor 120, a third additional line L8 which connects between the second supply line L2 between the extra cooler 132 and the fourth valve 194 and the first supply line L1 between the cooler 130 and the second valve 192, a fourth additional line L9 which connects between the first supply line L1 between the cooler 130 and the second valve 192 and the recirculation line L5 on the downstream of the sixth valve 196, and a fifth additional line L10 which connects between the second supply line L2 between the extra cooler 132 and the fourth valve 194 and a downstream of the fifth valve 195 of the return line L3.

In addition, the ship of the present embodiment further includes the fifth valve 195 which is installed on the return line L3, the twelfth valve 301 which is installed on the second additional line L7, the thirteenth vale 320 which is installed on the third additional line L8, the fourteenth valve 303 which is installed on the fourth additional line L9, and the fifteenth valve 304 which is installed on the fifth additional line L10.

The first to fifteenth valves 191, 192, 193, 194, 195, 196, 197, 198, 201, 202, 203, 301, 302, 303, and 304 of the present embodiment may be manually controlled by allowing a person to directly determine the operation condition of the system and may be automatically controlled to be opened or closed depending on a preset value.

Similar to the fourth embodiment, the refrigerant cycle of the ship of the present embodiment may be operated as the closed loop, the open loop, or the independent open loop. Hereinafter, a method for operating a refrigerant cycle as the closed loop, the open loop, or an independent open loop by a valve control will be described.

To operate the refrigerant cycle of the ship of the present embodiment as the closed loop, the system is operated while the first valve 191, the second valve 192, the third valve 193, the fifth valve 195, the sixth valve 196, and the tenth valve 202 are open, and the fourth valve 194, the ninth valve 201, the twelfth valve 301, the thirteenth valve 302, the fourteenth valve 303, and the fifteenth valve 304 are closed.

If the boil-off gas which is discharged from the storage tank T and then compressed by the extra compressor 122 is supplied to the recirculation line L5, the third valve 193 is closed to form the refrigerant cycle of the closed loop in which the boil-off gas circulates the extra compressor 122, the extra cooler 132, the sixth valve 196, the refrigerant heat exchanger 140, the refrigerant decompressing device 160, the refrigerant heat exchanger 140, and the tenth valve 202.

Similar to the fourth embodiment, when the refrigerant cycle is configured as the closed loop, nitrogen gas can be used as a refrigerant circulating the closed loop, and further includes a pipe through which the nitrogen gas is introduced into the refrigerant cycle of the closed loop.

Similar to the fourth embodiment, when the refrigerant cycle is operated as the closed loop, a predetermined flow rate of boil-off gas is circulated as the refrigerant in the refrigerant heat exchanger 140 irrespective of the re-liquefaction amount or the amount of boil-off gas required by the fuel consumption place 180.

The flow of the boil-off gas in the case where the refrigerant cycle of the ship of the present embodiment is operated as the closed loop will be described as follows.

The boil-off gas discharged from the storage tank T passes through the boil-off gas heat exchanger 110 and then compressed by the compressor 120, and a part thereof is cooled by the cooler 130 and then sent to the fuel consumption place 180, and the remaining part thereof is sent to the boil-off gas heat exchanger 110 along the return line L3. The boil-off gas sent to the boil-off gas heat exchanger 110 along the return line L3 exchanges heat with the boil-off gas discharged from the storage tank T to be cooled and is then heat-exchanged in the refrigerant heat exchanger 140 to be additionally cooled.

The boil-off gas cooled by the boil-off gas heat exchanger 110 and the refrigerant heat exchanger 140 is expanded by the first decompressing device 150 and thus the boil-off gas is partially or totally re-liquefied. When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is supplied to the storage tank T.

Meanwhile, the boil-off gas circulating the refrigerant cycle is compressed by the extra compressor 122, cooled by the extra cooler 132, and then sent to the refrigerant heat exchanger 140 along the recirculation line L5. The boil-off gas which passes through the extra compressor 122 and the extra cooler 132 and then sent to the refrigerant heat exchanger 140 is primarily heat-exchanged in the refrigerant heat exchanger 140 to be cooled and then sent to the refrigerant decompressing device 160 to be secondarily expanded and cooled. The boil-off gas which passes through the refrigerant decompressing device 160 is sent back to the refrigerant heat exchanger 140 to be used as a refrigerant which cools the boil-off gas passing through the boil-off gas heat exchanger 110 and then supplied to the refrigerant heat exchanger 140 along the return line L3 and the boil-off gas compressed by the extra compressor 122 and then supplied to the refrigerant heat exchanger 140 along the recirculation line L5. The boil-off gas which passes through the refrigerant decompressing device 160 and then used as the refrigerant in the refrigerant heat exchanger 140 is sent back to the extra compressor 122, thereby repeating the above-mentioned series of processes.

When the compressor 120 or the cooler 130 fails while the refrigerant cycle of the ship of the present embodiment is operated as the closed loop, the first valve 191, the second valve 192, the fifth valve 195, the sixth valve 196, and the tenth valve 202 are closed and the third valve 193 and the fourth valve 194 are open to allow the boil-off gas which is discharged from the storage tank T and then passes through the boil-off gas heat exchanger 110 to be supplied to the fuel consumption place 180 via the third valve 193, the extra compressor 122, the extra cooler 132, and the fourth valve 194.

If it is necessary to re-liquefy a part of the boil-off gas even when the compressor 120 or the cooler 130 fails while the refrigerant cycle of the ship of the present embodiment is operated as the closed loop, the fifteenth valve 304 is open so that a part of the boil-off gas may undergo the re-liquefaction process along the return line L3. In addition, When it is necessary to use boil-off gas compressed by the extra compressor 122 as the refrigerant of the refrigerant heat exchanger 140 while re-liquefying a part of the boil-off gas, the sixth valve 196 and the ninth valve 201 may be open or the sixth valve 196 and the tenth valve 202 may be open to operate the system.

The ship of the present embodiment uses the boil-off gas compressed by the compressor 120 as the refrigerant in the refrigerant heat exchanger 140 while the refrigerant cycle is operated as the closed loop, and may supply the boil-off gas compressed by the extra compressor 122 to the fuel consumption 180 or perform the re-liquefaction process on the compressed boil-off gas (hereinafter, referred to as a 'second closed loop').

As described above, the compressor 120 and the cooler 130 and the extra compressor 122 and the extra cooler 132 are separately described only for convenience of description and perform the same role. The redundancy concept is satisfied in that one ship includes two or more compressors and coolers. Therefore, the compressor 120 and the cooler 130 and the extra compressor 122 and the extra cooler 132 may be operated by changing the roles.

To operate the refrigerant cycle of the ship of the present embodiment as the second closed loop, the system is operated while the first valve 191, the third valve 193, the fourth valve 194, the twelfth valve 301, the fourteenth valve 303, and the fifteenth valve 304 are open, and the second valve 192, the fifth valve 195, the sixth valve 196, the ninth valve 201, the tenth valve 202, and the thirteenth valve 302 are closed.

If the boil-off gas which is discharged from the storage tank T and then compressed by the compressor 120 is supplied to the recirculation line L5, the first valve 191 is closed to form the refrigerant cycle of the closed loop in which the boil-off gas circulates the compressor 120, the cooler 130, the fourteenth valve 303, the refrigerant heat exchanger 140, the refrigerant decompressing device 160, the refrigerant heat exchanger 140, and the twelfth valve 301.

The flow of the boil-off gas in the case where the refrigerant cycle of the ship of the present embodiment is operated as the second closed loop will be described as follows.

After the boil-off gas discharged from the storage tank T passes through the boil-off gas heat exchanger 110 and passes through the third valve 193 and is compressed by the extra compressor 122 and cooled by the extra cooler 132, a part of the refrigerant is sent to the fuel consumption place 180 via the fourth valve 194 and the remaining part thereof is sent to the boil-off gas heat exchanger 110 along the return line L3 via the fifteenth valve 304. The boil-off gas sent to the boil-off gas heat exchanger 110 exchanges heat with the boil-off gas discharged from the storage tank T to be cooled and then to be additionally cooled by the refrigerant heat exchanger 140.

The boil-off gas cooled by the boil-off gas heat exchanger 110 and the refrigerant heat exchanger 140 is expanded by the first decompressing device 150 and thus the boil-off gas is partially or totally re-liquefied. When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is supplied to the storage tank T.

Meanwhile, the boil-off gas circulating the refrigerant cycle is compressed by the extra compressor 120, cooled by the extra cooler 130, and then sent to the refrigerant heat exchanger 140 via the fourteenth valve 303. The boil-off gas which passes through the compressor 120 and the cooler 130 and then sent to the refrigerant heat exchanger 140 is primarily heat-exchanged in the refrigerant heat exchanger 140 to be cooled and then sent to the refrigerant decompressing device 160 to be secondarily expanded and cooled. The boil-off gas which passes through the refrigerant decompressing device 160 is sent back to the refrigerant heat exchanger 140 to be used as a refrigerant which cools the boil-off gas passing through the boil-off gas heat exchanger 110 and then supplied to the refrigerant heat exchanger 140 along the return line L3 and the boil-off gas compressed by the compressor 120 and then supplied to the refrigerant heat exchanger 140 via the fourteenth valve 303. The boil-off gas passing through the refrigerant decompressing device 160 and used as the refrigerant in the refrigerant heat exchanger 140 is branched into the first additional line L6 while flowing along the recirculation line L5 and then is again branched into the second additional line L7 to be sent to the first supply line L1 after passing through the twelfth valve 301. The boil-off gas sent to the first supply line L1 is sent back to the compressor 120, thereby repeating the above series of processes.

When the extra compressor 122 or the extra cooler 132 fails while the refrigerant cycle of the ship of the present embodiment is operated as the second closed loop, the third valve 193, the fourth valve 194, the twelfth valve 301, the fourteenth valve 303, and the fifteenth valve 304 are closed and the first valve 191 and the second valve 192 are open to allow the boil-off gas which is discharged from the storage tank T and then passes through the boil-off gas heat exchanger 110 to be supplied to the fuel consumption place 180 via the first valve 191, the compressor 120, the cooler 130, and the second valve 192.

If it is necessary to re-liquefy a part of the boil-off gas even when the extra compressor 122 or the extra cooler 132 fails while the refrigerant cycle of the ship of the present embodiment is operated as the second closed loop, the fifth valve 195 is open so that a part of the boil-off gas may undergo the re-liquefaction process along the return line L3. In addition, when it is necessary to use boil-off gas compressed by the compressor 120 as the refrigerant of the refrigerant heat exchanger 140 while re-liquefying a part of the boil-off gas, the ninth valve 201 and the fourteenth valve 303 may be open or the twelfth valve 301 and the fourteenth valve 303 may be open to operate the system.

Meanwhile, to operate the refrigerant cycle of the ship of the present embodiment as the open loop, the first valve 191, the second valve 192, the third valve 193, the fifth valve 195, the sixth valve 196, the ninth valve 201, and the thirteenth valve 302 are open and the fourth valve 194, the tenth valve 202, the twelfth valve 301, the fourteenth valve 303, and the fifteenth valve 304 are closed.

Similar to the fourth embodiment, if the refrigerant cycle is operated as the open loop, the flow rate of the refrigerant to be sent to the refrigerant heat exchanger 140 may be flexibly controlled in consideration of the re-liquefaction amount and the required amount of boil-off gas in the fuel consumption place 180. In particular, when the amount of boil-off gas required in the fuel consumption place 180 is small, increasing the flow rate of the refrigerant sent to the refrigerant heat exchanger 140 may increase the re-liquefaction efficiency and the re-liquefaction amount. That is, when the refrigerant cycle is operated as the open loop, the boil-off gas of the flow rate exceeding the capacity of the extra compressor 122 may be supplied to the refrigerant heat exchanger 140.

The flow of the boil-off gas in the case where the refrigerant cycle of the ship of the present embodiment is operated as the open loop will be described as follows.

The boil-off gas discharged from the storage tank T passes through the boil-off gas heat exchanger 110 and is then branched into two flows, such that a part thereof is sent to the compressor 120 via the first valve 191 and the remaining part thereof is sent to the extra compressor 122 via the third valve 193.

After the boil-off gas sent to the compressor 120 is compressed by the compressor 120 and cooled by the cooler 130, a part of the boil-off gas is sent to the refrigerant heat exchanger 140 via the thirteenth valve 302 and the sixth valve 196, the other part thereof is sent to the fuel consumption place 180 via the second valve 192, and the remaining part thereof is sent to the boil-off gas heat exchanger 110 via the fifth valve 195.

After the boil-off gas sent to the extra compressor 122 is compressed by the extra compressor 122 and cooled by the extra cooler 132, a part of the boil-off gas is sent to the refrigerant heat exchanger 140 via the sixth valve 196 and the remaining part thereof passes through the thirteenth valve 302 and then branched into two.

One of the flows that pass through the extra compressor 122, the extra cooler 132, and the thirteenth valve 302 and are branched into two are supplied to the fuel consumption place 180 via the second valve 192, and the other is sent to the boil-off gas heat exchanger 110 via the fifth valve 195.

Similar to the fourth embodiment, for convenience of description the boil-off gas compressed by the compressor 120 and the boil-off gas separated by the extra compressor 122 are separately described, but the boil-off gas separated by the compressor 120 and the boil-off gas separated by the extra compressor 122 are joined to be sent to the refrigerant heat exchanger 140, the fuel consumption place 180, and the boil-off gas heat exchanger 110.

The boil-off gas sent to the refrigerant heat exchanger 140 via the sixth valve 196 is primarily heat-exchanged in the refrigerant heat exchanger 140 to be cooled, and secondarily expanded by the refrigerant decompressing device 160 to be cooled and supplied back to the refrigerant heat exchanger 140. The boil-off gas which passes through the refrigerant decompressing device 160 and then is supplied to the refrigerant heat exchanger 140 is used as a refrigerant which cools the boil-off gas passing through the boil-off gas heat exchanger 110 and then supplied to the refrigerant heat exchanger 140 along the return line L3 and the boil-off gas supplied to the refrigerant heat exchanger 140 from the compressor 120 or the extra compressor 122 through the sixth valve 196.

The boil-off gas used as the refrigerant in the refrigerant heat exchanger 140 after passing through the refrigerant decompressing device 160 is sent to the first supply line L1 through the ninth valve 201 to be discharged from the storage tank T and then joins with the boil-off gas passing through the boil-off gas heat exchanger 110, thereby repeating the above-mentioned series of processes.

The boil-off gas sent to the boil-off gas heat exchanger 110 along the return line L3 is primarily cooled by the boil-off gas heat exchanger 110, secondarily cooled by the refrigerant heat exchanger 140, and then expanded by the first decompressing device 150, such that the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is supplied to the storage tank T.

When the compressor 120 or the cooler 130 fails while the refrigerant cycle of the ship of the present embodiment is operated as the open loop, the first valve 191, the fifth valve 195, and the sixth valve 196, and the ninth valve 201 are closed to allow the boil-off gas which is discharged from the storage tank T and then passes through the boil-off gas heat exchanger 110 to be supplied to the fuel consumption place 180 via the third valve 193, the extra compressor 122, the extra cooler 132, the thirteenth valve 302, and the second valve 192.

If it is necessary to re-liquefy a part of the boil-off gas even when the compressor 120 or the cooler 130 fails while the refrigerant cycle of the ship of the present embodiment is operated as the open loop, the fifth valve 195 is open so that a part of the boil-off gas may undergo the re-liquefaction process along the return line L3. In addition, when it is necessary to use boil-off gas compressed by the extra compressor 122 as the refrigerant of the refrigerant heat exchanger 140 while re-liquefying a part of the boil-off gas, the ninth valve 201 and the fourteenth valve 303 may be open or the tenth valve 202 and the fourteenth valve 303 may be open to operate the system.

To operate the refrigerant cycle of the ship of the present embodiment as the independent open loop, the system is operated while the first valve 191, the second valve 192, the third valve 193, the fifth valve 195, the sixth valve 196, and the ninth valve 201 are open, and the fourth valve 194, the tenth valve 202, the twelfth valve 301, the thirteenth valve 302, the fourteenth valve 303, and the fifteenth valve 304 are closed. When the refrigerant cycle is operated as the independent open loop, the system can be operated more easily than when the open loop is operated.

The flow of the boil-off gas in the case where the refrigerant cycle of the ship of the present embodiment is operated as the independent open loop will be described as follows.

The boil-off gas discharged from the storage tank T passes through the boil-off gas heat exchanger 110 and is then branched into two flows, such that a part thereof is sent to the compressor 120 via the first valve 191 and the remaining part thereof is sent to the extra compressor 122 via the third valve 193. After the boil-off gas sent to the extra compressor 120 is compressed by the compressor 120 and cooled by the cooler 130, a part of the boil-off gas is sent to the fuel consumption place 180 via the second valve 192 and the other part thereof is sent to the boil-off gas heat exchanger 110 via the fifth valve 195. The boil-off gas sent to the extra compressor 122 is compressed by the extra compressor 122, cooled by the extra cooler 132, and then sent to the refrigerant heat exchanger 140 via the sixth valve 196.

The boil-off gas which is compressed by the extra compressor 122 and then sent to the refrigerant heat exchanger 140 passing through the sixth valve 196 is used as the refrigerant which cools the boil-off gas which is primarily heat-exchanged in the refrigerant heat exchanger 140 to be cooled, secondarily expanded by the refrigerant decompressing device 160 to be cooled, and then supplied back to the refrigerant heat exchanger 140 to pass through the boil-off gas heat exchanger 110 and then be supplied to the refrigerant heat exchanger 140 via the return line L3 and the boil-off gas which is compressed by the extra compressor 122 and then supplied to the refrigerant heat exchanger 140 through the sixth valve 196.

The boil-off gas used as the refrigerant in the refrigerant heat exchanger 140 after passing through the refrigerant decompressing device 160 is sent to the first supply line L1 through the ninth valve 201 to be discharged from the storage tank T and then joins with the boil-off gas passing through the boil-off gas heat exchanger 110, thereby repeating the above-mentioned series of processes.

The boil-off gas compressed by the compressor 120 and sent to the boil-off gas heat exchanger 110 along the return line L3 is primarily cooled by the boil-off gas heat exchanger 110, secondarily cooled by the refrigerant heat exchanger 140, and then expanded by the first decompressing device 150, such that the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the boil-off gas heat exchanger 110. The liquid separated by the gas-liquid separator 170 is supplied to the storage tank T.

When the compressor 120 or the cooler 130 fails while the refrigerant cycle of the ship of the present embodiment is operated as the independent open loop, the first valve 191, the fifth valve 195, the sixth valve 196, and the ninth valve 201 are closed and the thirteenth valve 302 is open to allow the boil-off gas which is discharged from the storage tank T and then passes through the boil-off gas heat exchanger 110 to be supplied to the fuel consumption place 180 via the third valve 193, the extra compressor 122, the extra cooler 132, the thirteenth valve 302, and the second valve 192.

If it is necessary to re-liquefy a part of the boil-off gas even when the compressor 120 or the cooler 130 fails while the refrigerant cycle of the ship of the present embodiment is operated as the independent open loop, the fifth valve 195 is open so that a part of the boil-off gas may undergo the re-liquefaction process along the return line L3. In addition, When it is necessary to use boil-off gas compressed by the extra compressor 122 as the refrigerant of the refrigerant heat exchanger 140 while re-liquefying a part of the boil-off gas, the sixth valve 196 and the ninth valve 201 may be open or the sixth valve 196 and the tenth valve 202 may be open to operate the system.

The present invention is not limited to the above exemplary embodiments and therefore it is apparent to a person with ordinary skill in the art to which the present invention pertains that the exemplary embodiments of the present invention may be variously modified or changed without departing from the technical subjects of the present invention.

The invention claimed is:

1. A ship including a storage tank storing liquefied gas, comprising:

a storage tank configured to store liquefied gas;

a boil-off gas line configured to generate a boil-off gas flow discharged from the storage tank;

a first compressor configured to compress at least part of the boil-off gas flow;

a first valve configured to selectively connect between the boil-off gas line and the first compressor;

a second compressor configured to compress at least part of boil-off gas flow;

a second valve configured to selectively connect between the boil-off gas line and the second compressor;

a first line configured to receive and process a first flow of compressed boil-off gas, wherein the first flow comprises compressed boil-off gas from at least one of the first compressor and the second compressor;

a first decompressor installed on the first line and configured to expand and cool the first flow flowing through the first line;

a second line configured to receive and process a second flow of compressed boil-off gas for returning to the storage tank, wherein the second flow comprises compressed boil-off gas from at least one of the first compressor and the second compressor;

a first heat exchanger configured to cool the second flow with the boil-off gas flowing through the boil-off gas line from the storage tank;

a second heat exchanger configured to cool the second flow flowing through the second line downstream the first heat exchanger with the first flow flowing through the first line downstream the first decompressor;

a second decompressor installed on the second line downstream the second heat exchanger and configured to expand the second flow to liquefy at least part of the second flow;

a first connection line connecting the first line downstream the second heat exchanger to the boil-off gas line;
a third valve installed on the first connection line and configured to selectively connect between the first line downstream the second heat exchanger and the boil-off gas line to add the first flow to the boil-off gas flow;
a second connection line connecting the first line downstream the second heat exchanger to a point between the first valve and the first compressor;
a fourth valve installed on the second connection line and configured to selectively connect between the first line downstream the second heat exchanger and the first valve;
a third line connecting between a first point downstream the first compressor and a second point downstream the second compressor;
a fifth valve installed on the third line and configured to selectively connect between the first point and the second point,
wherein, when the fourth valve is open, the first flow returns to the first compressor;
wherein, when the fifth valve is closed, compressed boil-off gas from the first compressor is supplied to the first line as the first flow, and compressed boil-off gas from the second compressor is not supplied to the first line,
wherein, when the fifth valve is open, the compressed boil-off gas from the first compressor and the compressed boil-off gas from the second compressor are combined and then distributed between the first line and the second line as the first flow and the second flow,
wherein, when the first valve is closed, the third valve is closed, the fourth valve is open, and the fifth valve is closed, the first flow forms a closed refrigeration cycle through the first compressor, the first decompressor and the second heat exchanger,
wherein, when the first valve is closed, the third valve is closed, the fourth valve is open, the fifth valve is closed, and the second valve is open, the first flow forms a closed refrigeration cycle through the first compressor, the first decompressor and the second heat exchanger, and the boil-off gas flow in the boil-off gas line is supplied to the second compressor,
wherein the ship further comprises an engine connected to the first line and configured to consume a portion of the first flow of compressed boil-off gas.

2. The ship of claim 1, wherein the portion of the first flow consumed at the engine is at a first pressure between 10 bar and 100 bar, wherein at least one of the first compressor and the second compressor is configured to compress the first flow to the first pressure.

3. The ship of claim 2, wherein the engine is a dual-fuel engine and the pressure is about 16 bar.

4. The ship of claim 2, wherein the engine is a dual-fuel diesel electric (DFDE) engine and the pressure is about 6.5 bar.

5. The ship of claim 1, wherein when the first valve is closed, the third valve is closed, the fourth valve is open, and the fifth valve is closed, the first flow flows through the closed refrigeration cycle at a predetermined flow rate regardless of a rate of consumption of the first flow at the engine.

6. The ship of claim 1, wherein the ship is configured to control the first valve, the second valve, the third valve, the fourth valve, and the fifth valve to adjust a rate of the first flow based on a flow rate of the boil-off gas discharged from the storage tank and further based on a rate of consumption of the first flow at the engine.

7. The ship of claim 6, wherein when the first valve is closed, the third valve is closed, the fourth valve is open, and the fifth valve is closed, the first flow flows through the closed refrigeration cycle at a predetermined flow rate regardless of a rate of consumption of the first flow at the engine.

8. The ship of claim 1, wherein the engine is a dual-fuel engine, wherein when the first valve, the second valve, the third valve and the fifth valve are open and the fourth valve is closed, the portion of the first flow consumed at the engine is at a pressure of about 20 bara.

* * * * *